United States Patent
Ogata et al.

(10) Patent No.: US 8,767,310 B2
(45) Date of Patent: Jul. 1, 2014

(54) ZOOM LENS, AND IMAGING APPARATUS INCORPORATING THE SAME

(71) Applicant: Olympus Imaging Corp., Tokyo (JP)

(72) Inventors: Yasuji Ogata, Tokyo (JP); Yasuharu Yamada, Tokyo (JP); Toshio Takahashi, Tokyo (JP); Toyoki Kon, Tokyo (JP)

(73) Assignee: Olympus Imaging Corp., Toyko (JP)

( * ) Notice: Subject to any disclaimer, the term of this patent is extended or adjusted under 35 U.S.C. 154(b) by 0 days.

(21) Appl. No.: 14/034,544

(22) Filed: Sep. 23, 2013

(65) Prior Publication Data

US 2014/0022647 A1    Jan. 23, 2014

Related U.S. Application Data

(62) Division of application No. 13/136,052, filed on Jul. 20, 2011, now Pat. No. 8,582,212.

(30) Foreign Application Priority Data

Jul. 23, 2010    (JP) .................................. 2010-166160

(51) Int. Cl.
*G02B 15/14*    (2006.01)
*G02B 9/34*    (2006.01)
*G02B 15/173*    (2006.01)
*G02B 13/04*    (2006.01)

(52) U.S. Cl.
CPC .............. *G02B 13/04* (2013.01); *G02B 15/173* (2013.01)
USPC .......................................... 359/686; 359/680

(58) Field of Classification Search
CPC ........ G02B 15/14; G02B 15/15; G02B 15/16; G02B 15/177
USPC .................................. 359/676, 680–684, 686
See application file for complete search history.

(56) References Cited

U.S. PATENT DOCUMENTS

| | | | |
|---|---|---|---|
| 7,212,351 B2 | 5/2007 | Kawamura | |
| 7,339,745 B2 | 3/2008 | Hozumi et al. | |
| 7,443,599 B2 * | 10/2008 | Kohno et al. | 359/682 |
| 7,450,319 B2 | 11/2008 | Ishii et al. | |
| 7,633,686 B2 * | 12/2009 | Souma | 359/686 |
| 7,652,826 B2 | 1/2010 | Katakura | |
| 7,656,590 B2 * | 2/2010 | Miyata et al. | 359/686 |
| 2009/0251781 A1 | 10/2009 | Adachi et al. | |

FOREIGN PATENT DOCUMENTS

| | | |
|---|---|---|
| JP | 2006-308929 | 11/2006 |
| JP | 2007-171743 | 7/2007 |
| JP | 2009-122620 | 6/2009 |

* cited by examiner

*Primary Examiner* — Darryl J Collins
(74) *Attorney, Agent, or Firm* — Kenyon & Kenyon LLP

(57) ABSTRACT

The invention provides a zoom lens, characterized by comprising, a zoom lens, which comprises, in order from an object side thereof: a first lens group of negative refracting power, a second lens group of positive refracting power, a third lens group of negative refracting power, and a fourth lens group of positive refracting power, wherein: upon zooming from a wide-angle end to a telephoto end of the zoom lens, a separation between the respective lens groups changes, upon focusing from a focusing-on-infinity state to a close-range focusing state, the third lens group moves in an optical axis direction, and the conditions (1) and (2) are satisfied at the wide-angle end.

19 Claims, 25 Drawing Sheets

ZOOM LENS, AND IMAGING APPARATUS INCORPORATING THE SAME

BACKGROUND OF THE INVENTION

So far, some digital camera products have been known to be capable of taking moving images. In recent years, interchangeable type digital cameras, especially an interchangeable lens compatible with the function of the camera body of taking moving images have also been under study.

Only the requirement for conventional cameras designed to take still images has been that they are in focus on target subjects in the moment of image shooting after determination of the composition, because their object has been not to miss blink-of-an-eye shutter chances. For instance, the so-called autofocus (AF) function has been adopted because of its combined high speed/accuracy.

In the taking of moving images with some video cameras designed for professional use, on the other hand, a skilled cameraman has implemented focusing operation in the manual focus (MF) mode. For many consumer-oriented video cameras, however, it is required to put the AF system constantly in operation thereby keeping an in-focus state depending on object distances. To this end, the contrast AF mode (the so-called climbing mode) relying upon an imaging device has been adopted.

Further, to keep the in-focus state, the focus lens is constantly subjected to back-and-fore, minute movement (called wobbling) in the optical axis direction to measure contrast changes. As the in-focus state is judged as being changing, it causes the focus lens to be properly moved for re-focusing operation. This wobbling function requires very fast operation depending on frame rates; so there is still mounting demand for reducing the weight of a lens used for wobbling.

The range of movement of the constantly moving focus lens remains within the depth of focus. Accordingly, it is controlled such that any out-of-focus state during wobbling cannot be recognized; however, when there is a large image magnification change, images look quite unnatural because they look as if they were always waving. Accordingly, it is still a vital requirement to reduce or minimize the magnification changes during wobbling.

Further, as there is a large change in the focus sensitivity (the amount of movement of the image plane per unit amount of movement of the lens) of the wobbling lens during zooming, it gives rise to a large difference in the amount of movement required for the wobbling lens at the wide-angle and telephoto ends, resulting in difficulty in control of fast and minute movement. It is therefore desired that the amount of change in the focus sensitivity of the wobbling lens be reduced as much as possible.

Patent Publication 1 has come up with a design example for small-format, less costly telephoto zoom lenses. According to the teachings, a positive-negative-positive three-groups zoom type is adopted and focusing is implemented at the second lens group, thereby making it possible to set up a small-format, less costly telephoto zoom lens with fewer lenses.

Patent Publication 2, and Patent Publication 3 has proposed a zoom lens finding an interchangeable lens system application for digital cameras with the taking of moving image in mind. With the zoom lens proposed in Patent Publication 2, focusing is implemented with fewer lenses.

For the negative power-leadoff type zoom lenses designed typically for size and cost reductions, on the other hand, such zoom lenses as set forth in Patent Publications 4, 5 and 6 have been known so far in the art. These are zoom lenses that are well fit for compact cameras and achieve a zoom ratio of the order of 3 with fewer lenses. They are operated in the rear focusing mode involving movement of one lens.

However, the zoom lens set forth in Patent Publication 1 is far away from being suitable for the taking of moving images because of too large image magnification changes during wobbling. In the zoom lenses set forth in Patent Publications 2 and 3, there is a fairly large number of lens groups used, which is apt to result not only in the need for using a lot more lenses, but also in bulkier size and higher costs.

The first aspect of the invention has been achieved with the above problems in mind, and has for its object to provide a negative-positive-negative-positive four-groups zoom lens favorable for small-format telephoto zoom lenses and having a screen easy to view during wobbling. Another object of the first aspect of the invention is to provide a zoom lens making it easy for an operator to view images during wobbling operation.

It is thus possible to provide a zoom lens that finds applications as an interchangeable lens system for digital cameras, is well compatible with the function of taking moving images, enables wobbling, and works more in favor of size and cost reductions. Yet another object of the first aspect of the invention is to provide an imaging apparatus equipped with such a zoom lens.

Referring again to the zoom lens disclosed in Patent Publication 2, its size is apt to grow large because it is a telephoto zoom lens of the positive power-leadoff type.

Referring again to the zoom lenses disclosed in Patent Publications 4 and 5, the taking of moving images is factored out, so intentional wobbling would result in large magnification changes and the inability to take moving images.

The second aspect of the invention has been figured out with the aforesaid problems in mind. One object of the second aspect of the invention is to provide a zoom lens working more in favor of size reductions and having a screen easier to view upon focusing, and another object is to provide a zoom lens easier to view images during wobbling operation.

[Patent Publication 1]
U.S. Pat. No. 7,450,319
[Patent Publication 2]
JP(A) 2000-122620
[Patent Publication 3]
U.S. patent application Ser. No. 2009/0251781
[Patent Publication 4]
U.S. Pat. No. 7,212,351
[Patent Publication 5]
U.S. Pat. No. 7,339,745
[Patent Publication 6]
U.S. Pat. No. 7,652,826

SUMMARY OF THE INVENTION

To achieve the aforesaid objects, the zoom lens, and the imaging apparatus, according to the first aspect of the invention is carried out in any one of the following embodiments.

According to the first aspect of the invention, there is a zoom lens provided, which comprises, in order from an object side thereof, a first lens group of positive refracting power,
a second lens group of negative refracting power,
a third lens group of positive refracting power, and
a fourth lens group of negative refracting power,
wherein:

upon zooming from a wide-angle end to a telephoto end of the zoom lens, a separation between the respective lens group changes, a separation between the first lens group and the second lens group becomes wide, and a separation between the second lens group and the third lens group grows narrow;

upon focusing from a focusing-on-infinity state to a close-range focusing state, the fourth lens group moves in an optical axis direction; and the following Conditions (1) and (2) are satisfied at the wide-angle end:

$$|(100*(y1'-y1)/y1)|/\Delta s<1.2 \quad (1)$$

$$|(100*(y0.7'-y0.7)/y0.7)|/\Delta s<1.2 \quad (2)$$

where y1 is the maximum image height on an imaging plane,
y0.7 is seven-tenth of the maximum image height,
y1' is a ray height at a position where, when there is a defocus quantity of Δs from time of focusing on infinity as the fourth lens group is moved to an object at infinity, a chief ray having the same angle of view as an image-taking angle of view reaching the image height y1 upon focusing on infinity intersects the imaging plane,
y0.7' is a ray height at a position where, when there is a defocus quantity of Δs from time of focusing on infinity as the fourth lens group is moved to an object at infinity, a chief ray having the same angle of view as an image-taking angle of view reaching the image height y0.7 upon focusing on infinity intersects the imaging plane, and
Δs is 8*the maximum image height y1/1000, provided that y1, y0.7, y1', y0.7' and Δs are all given in mm.

The requirements for, and the advantages of, the aforesaid arrangement for the zoom lens according to the first aspect of the invention are now explained.

By adoption of the positive power-leadoff type zoom lens where the lens group of positive refracting power is located on the most object side, it is possible to design a lens arrangement preferable as a telephoto zoom lens because it works in favor of making sure the desired zoom ratio and the desired brightness at the telephoto end. Substantial zooming takes place by a separation change between the first and the second lens group and a separation change between the second and the third lens group. In addition, the provision of the fourth lens group of negative refracting power allows the size of the first, second and third lens groups to remain small, working in favor of setting up a small-format, less costly zoom lens.

The first aspect of the invention is well fit for a small-format telephoto zoom lens. With a conventional zoom lens having a positive-negative-positive refracting power layout in order from its object side with the second lens group used as a focusing lens group, it is easy to correct aberration fluctuations in near distances. However, it is difficult to control driving mechanisms because the weight of the focusing lens group is heavy, the sensitivity of the second lens group to focusing changes largely, etc.

There is thus the need for achieving any focusing mode that takes care of the fast driving (plus wobbling in the taking of moving images) of the focusing lens group in the zoom lens; so there is mounting demand for further size reductions of the focusing group. Moreover, to reduce changes in the sensitivity of the focusing lens group to focusing as zooming takes place, it has been found that the focusing lens group should preferably be located on an image side with respect to the third lens group. In the first aspect of the invention, therefore, the fourth lens group of negative refracting power is located on the image side of the third lens group of positive refracting power so that focusing (plus wobbling) is implemented with the fourth lens group. Upon zooming, the third and the fourth lens group may be moved in unison. However, if the separation between these lens groups is made variable, it is then possible to reduce field curvature changes in association with zooming.

The zoom lens of the first aspect of the invention, because of having such an arrangement, enables image magnification changes to be much more reduced than a conventional zoom lens upon focusing (plus wobbling during the taking of moving images). The amount of image magnification changes differs with image heights; that amount cannot fully be reduced only with specific image heights, so it must be reduced throughout the screen.

Conditions (1) and (2) are provided for that purpose: they are the ones for determining the amount of image magnification changes relative to the defocus quantity. It is here noted that although differing with the value of defocus quantity Δs, calculation is made in terms of a defocus quantity equivalent to an allowed depth. Generally, the allowed depth may be represented by F-number*allowed diameter of circle of confusion. In the first aspect of the invention, however, the F-number is supposed to be equal to 8, and the allowed diameter of circle of confusion is supposed to be equal to the maximum image height (y1)/1000.

It may be relatively easy to satisfy either one of Conditions (1) and (2), but there is the need for satisfying both Conditions (1) and (2) so as to reduce the amount of image magnification changes throughout the screen, as contemplated herein. It has now been found that by satisfying both conditions, image magnification changes can be kept small even in other image height states and focal length states. Exceeding the upper limits to Conditions (1) and (2) is not preferable because the amount of image magnification changes grows large.

FIG. 1 is illustrative in schematic of the definitions of Conditions (1) and (2) for the zoom lens according to the first aspect of the invention. For convenience of illustration, the shape and number of lenses in each of the first to fourth lens groups are simplified, while the amount of movement of, and the optical path through, the fourth lens group supposed to wobble are exaggerated.

The zoom lens according to the first aspect of the invention is built up of, in order from its object side to its image side (imaging plane), a first lens group of positive refracting power, a second lens group of negative refracting power, a third lens group of positive refracting power, and a fourth lens group of negative refracting power.

In FIG. 1, a light ray A is indicative of a chief ray incident on the position of the maximum image height (y1) at the imaging plane upon focusing on infinity, and a light ray B is indicative of a chief ray incident on the position (y0.7) seven-tenth of the maximum image height (y1) at the imaging plane upon focusing on infinity.

The zoom lens according to the first aspect of the invention is characterized in that the fourth lens group is moved for focusing or wobbling. In FIG. 1, a light ray A' is indicative of a displacement of the chief ray A as the fourth lens group is moved by focusing or wobbling to form an image at a position separate away from the imaging plane by the defocus quantity Δs.

In FIG. 1, a light ray B' is indicative of a displacement of the chief ray B as the fourth lens group is moved by focusing or wobbling to form an image at a position separate away from the imaging plane by the defocus quantity Δs. It is here noted that the defocus quantity Δs is supposed to be 8*the maximum image height (y1)/1000.

An image height where the ray A' is imaged at the imaging plane is defined by y1', and an image height where the ray B' is imaged at the imaging plane is defined by y0.7'.

The fourth lens group of negative refracting power works in favor of making sure weight reductions and sensitivity to focusing. In addition, although the separation between the fourth lens group and the image plane grows wide as the fourth lens group is let out, the height of incidence of the chief ray on the fourth lens group off the optical axis becomes so low that magnification changes at the imaging plane are canceled out. Therefore, it is easy to reduce magnification changes in association with the movement of the fourth lens group, and reduce magnification changes upon focusing (plus wobbling) operation. This favors especially the taking of moving images. Thus, the fourth lens group may be set up in the form of not only the focusing group but also the wobbling group that wobbles in the axial direction prior to focusing.

To obtain moving images of high quality on a large-screen TV or the like with stricter conditions imposed thereon, the following conditions (1-1) and (2-1) should more preferably be satisfied at the telephoto end:

$$|(100*(y1'-y1)/y1)|/\Delta s < 1.0 \quad (1\text{-}1)$$

$$|(100*(y0.7'-y0.7)/y0.7)|/\Delta s < 1.0 \quad (2\text{-}1)$$

It is preferable that upon zooming from the wide-angle end to the telephoto end,
the first lens group moves to the object side;
the second lens group moves to the image side before it moves to the object side;
the third lens group moves to the object side; and
the fourth lens group moves to the object side.

By adoption of such an arrangement, the whole zoom lens length at the wide-angle end can be curtailed and, accordingly, its diametrical size can be curtailed as well, working in favor of making sure any desired zoom ratio. Such movement of the second lens group as mentioned above works more in favor of optical performance because of the ability to adjust balance when substantial zooming is shared by the second lens group and the third lens group.

Preferably, the fourth lens group consists of, in order from the object side:
a positive lens, and
a negative lens.

While the weight of the fourth lens group is reduced, aberrations are canceled out mutually on the positive lens and the negative lens, which works in favor of recuing various aberrations at the fourth lens group.

Preferably, the third lens group consists of, in order from the objet side,
an object-side lens subgroup of positive refracting power, and
an image-side lens subgroup of positive refracting power, and
an axial air separation between the object-side lens subgroup and the image-side lens subgroup becomes the greatest among air separations in the third lens group, with satisfaction of the following Conditions (3) and (4):

$$0.8 < f3f/f3r < 1.8 \quad (3)$$

$$0.1 < dA/f3 < 0.6 \quad (4)$$

where f3f is the focal length of the object-side lens subgroup in the third lens group,
f3r is the focal length of the image-side lens subgroup in the third lens group,
dA is an air separation sandwiched between the object-side lens subgroup and the image-side lens subgroup, and
f3 is the focal length of the third lens group.

Condition (3) relates to the preferable ratio between the focal length of the object-side lens subgroup and the focal length of the image-side lens subgroup. The refracting power of the third lens group is properly shared by the object-side lens subgroup and the image-side lens subgroup so that spherical aberrations and off-axis aberrations can be corrected in a well-balanced state. As the lower limit to Condition (3) is set at not less than 0.8, it enables the sharing of refracting power by the object-side lens subgroup to become reasonable, facilitating prevention of occurrence of spherical aberrations. As the upper limit to Condition (3) is set at not greater than 1.8, it facilitates prevention of occurrence of off-axis coma.

Condition (4) relates to the preferable air separation distance between the object-side lens subgroup and the image-side lens subgroup. Preferably, Condition (4) cooperated with Condition (3) to provide a proper determination of the air separation distance between the object-side lens subgroup and the image-side lens subgroup. As the lower limit to Condition (4) is set at not less than 0.1, it makes sure the proper air separation distance, making it easy for the object-side lens subgroup and the image-side lens subgroup to provide aberration correction sharing, working in favor of off-axis coma in particular. It is preferable to set the upper limit to Condition (4) at not greater than 0.6, because of the ability to prevent the full length of the third lens group from growing too long.

Preferably, the respective lens groups satisfy the following Conditions (5), (6), (7) and (8):

$$2.0 < f1/fw < 4.0 \quad (5)$$

$$-1.0 < f2/fw < -0.5 \quad (6)$$

$$0.5 < f3/fw < 1.0 \quad (7)$$

$$-1.5 < f4/fw < -0.5 \quad (8)$$

where fw is the focal length of the whole zoom lens system upon focusing on infinity at the wide-angle end,
f1 is the focal length of the first lens group,
f2 is the focal length of the second lens group,
f3 is the focal length of the third lens group, and
f4 is the focal length of the fourth lens group.

Condition (5) relates to the preferable refracting power of the first lens group. As the lower limit to Condition (5) is set at not less than 2.0, it enables the refracting power of the first lens group to be properly kept so that aberration correction can easily be made with the first lens group made up of fewer lenses. As the upper limit to Condition (5) is set at not greater than 4.0, it makes sure the first lens group has refracting power, helping reduce the amount of movement of the first lens group in association with zooming and, hence, curtailing the full length on the telephoto end side.

Condition (6) relates to the preferable refracting power of the second lens group. As the lower limit to Condition (6) is set at not less than −1.0, it makes sure the second lens group has refracting power, helping reduce the amount of movement of the first and second lens groups in association with zooming and, hence, working in favor of size reductions. As the upper limit to Condition (6) is set at not greater than −0.5, it enables the refracting power of the second lens group to be properly reduced, facilitating aberration correction at the second lens group.

Condition (7) relates to the preferable refracting power of the third lens group. As the lower limit to Condition (7) is set at not less than 0.5, it enables the refracting power of the third lens group to be properly kept, working in favor of aberration correction. As the upper limit to Condition (7) is set at not greater than 1.0, it makes sure the third lens group has refracting power, working in favor of size reductions.

Condition (8) relates to the preferable refracting power of the fourth lens group. As the lower limit to Condition (8) is set at not less than −1.5, it makes sure the fourth lens group has refracting power, helping reduce the amount of focusing movement and, hence, working in favor of size reductions. As the upper limit to Condition (8) is set at not greater than −0.5, it enables the refracting power of the fourth lens group to be properly kept, helping hold back the occurrence of aberrations at the fourth lens group and, hence, enabling correction of aberrations even with fewer lenses.

Preferably, the third lens group includes an aperture stop on an object side with respect to the position where the axial air separation becomes the widest.

Such an arrangement enables aberration correction to be shared on the front and rear sides of that air separation in the third lens group. In addition, if the aperture stop is located at that position, there is then a light ray state (such as the height of incidence of an off-axis chief ray on the fourth lens group or the angle which the off-axis chief ray forms with the optical axis) created, which is preferable for implementing focusing or wobbling at the fourth lens group.

Preferably, the aperture stop moves in unison with the third lens group during zooming. Such an arrangement works in favor of size reductions of the third lens group in the diametrical direction.

Preferably, the fourth lens group consists of, in order from the object side:

a meniscus lens of positive refracting power, and a lens of negative refracting power. Such an arrangement provides the minimum number of lenses necessary for correction of chromatic aberrations at the fourth lens group, and locating the two lenses at a space works for correction of coma, etc.

It is here preferable that the fourth lens group satisfies the following Conditions (9) and (10):

$$0 < n4n - n4p \quad (9)$$

$$15 < \nu 4n - \nu 4p \quad (10)$$

where n4p is the d-line refractive index of the meniscus lens of positive refracting power in the fourth lens group, n4n is the d-line refractive index of the lens of negative refracting power in the fourth lens group, ν4p is the Abbe constant of the meniscus lens of positive refracting power in the fourth lens group, and ν4n is the Abbe constant of the lens of negative refracting power in the fourth lens group.

As the refractive index of the negative lens is set high enough to satisfy Condition (9), it provides satisfactory correction of aberrations such as field curvature. As the Abbe constant of the negative lens is set large enough to satisfy Condition (10), it allows for satisfactory correction of chromatic aberrations.

Preferably, the following Condition (11) is satisfied:

$$8.0 < y1 < 25.0 \quad (11)$$

where y1 is the maximum image height at the imaging plane throughout the zoom lens system.

As the lower limit to Condition (11) is set at not less than 8.0, it makes sure the desired imaging area, facilitating prevention of signal noises upon high-sensitivity image shooting. In addition, this leads to an increase in the amount of movement for focusing (plus wobbling), facilitating control. As the upper limit to Condition (11) is set at not greater than 25.0, it results in prevention of any increase in the imaging area, facilitating prevention of the zoom lens from getting bulkier. In addition, this also helps reduce the size of the lens for carrying out focusing (plus wobbling), resulting in power savings.

This also works in favor of making sure the positive lens group-leadoff type zoom lens according to the first aspect of the invention has the desired zoom ratio. To reduce shadings, it is preferable to design the fourth lens group of negative refracting power in such a way as to be properly spaced away from the image plane; that is, it is preferable for the zoom lens to satisfy the following Conditions (12) and (13):

$$3.3 < ft/fw < 5.5 \quad (12)$$

$$10° < \omega w < 20° \quad (13)$$

where fw is the focal length of the whole zoom lens system upon focusing on infinity at the wide-angle end, ft is the focal length of the whole zoom lens system upon focusing on infinity at the telephoto end, and ωw is the maximum half angle of view of the whole zoom lens system upon focusing on infinity at the wide-angle end.

These conditions are provided for the purpose of determining the zoom lens specifications preferable for the inventive lens arrangement. More specifically, Condition (12) is provided for the purpose of determining the preferable zoom ratio. It is preferable to set the lower limit to Condition (12) at not less than 3.3, because of achieving any desired zoom ratio well compatible with a variety of photographic scenes. As the upper limit to Condition (12) is set at not greater than 5.5, it works in favor of aberration fluctuation reductions and making sure brightness at the telephoto end.

Condition (13) is provided to determine the preferable half angle of view at the telephoto end. As the lower limit is set at not less than 10°, it makes sure any desired angle of view well compatible with a variety of photographic scenes. As the upper limit is set at not greater than 20°, it enables the angle of view to be properly kept, working in favor of shading reductions.

The present invention also provides an imaging apparatus equipped with any one of the zoom lenses as described above and an imaging device.

It is here noted that unless otherwise defined, the arrangements according to the first aspect of the invention are all supposed to be in the focusing-on-infinity state. It is also noted that two or more requirements for the arrangements as described above should more preferably be satisfied at the same time.

More preferably for each condition in the first aspect of the invention, further limitations should be added to the upper and lower limit values. By using such upper and lower limit values, much more enhanced advantages could be obtained.

To Conditions (1) and (1-1), the upper limit value should more preferably be set 0.8, especially 0.7.

To Conditions (2) and (2-1), the upper limit value should more preferably be set at 0.8, especially 0.7.

To Condition (3), the lower limit value should more preferably be set at 0.9, and the upper limit value should more preferably be set at 1.4, especially 1.2.

To Condition (4), the lower limit value should more preferably be set at 0.3, and the upper limit value should more preferably be set at 0.5.

To Condition (5), the lower limit value should more preferably be set at 3.0, and the upper limit value should more preferably be set at 3.5.

To Condition (6), the lower limit value should more preferably be set at −0.9, and the upper limit value should more preferably be set at −0.65.

To Condition (7), the lower limit value should more preferably be set at 0.65, and the upper limit value should more preferably be set at 0.8.

To Condition (8), the lower limit value should more preferably be set at −1.3, especially −1.0, and the upper limit value should more preferably be set at −0.7, especially −0.9.

To Condition (9), the lower limit value should more preferably be set at 0.005. In view of lens material availability, there may be an upper limit value of 0.7 provided.

To Condition (10), the lower limit value should more preferably be set at 15.2. In view of lens material availability, there may be an upper limit value of 60 provided.

To Condition (11), the lower limit value should more preferably be set at 10.0, and the upper limit value should more preferably be set at 20.0, especially 15.0.

To achieve the aforesaid objects, the zoom lens, and the imaging apparatus, according to the second aspect of the invention is set up in any one of the following embodiments.

According to the second aspect of the invention, there is a zoom lens provided, which comprises, in order from an object side thereof, a first lens group of negative refracting power,
a second lens group of positive refracting power,
a third lens group of negative refracting power, and
a fourth lens group of positive refracting power, wherein:
upon zooming from a wide-angle end to a telephoto end,
a separation between the respective lens group changes,
a separation between the first lens group and the second lens group becomes narrow;

upon focusing from a focusing-on-infinity state to a close-range focusing state,
the third lens group moves in an optical axis direction; and
the following conditions (1) and (2) are satisfied at the wide-angle end:

$$|(100*(y1'-y1)/y1)|/\Delta s < 1.2 \quad (1)$$

$$|(100*(y0.7'-y0.7)/y0.7)|/\Delta s < 1.2 \quad (2)$$

where y1 is the maximum image height on an imaging plane throughout the zoom lens, y0.7 is seven-tenth of the maximum image height, y1' is a ray height at a position where, when there is a defocus quantity of $\Delta s$ from time of focusing on infinity as the fourth lens group is moved to an object at infinity, a chief ray having the same angle of view as an image-taking angle of view reaching the image height y1 upon focusing on infinity time intersects an imaging plane, y0.7' is a ray height at a position where, when there is a defocus quantity of $\Delta s$ from time of focusing on infinity as the fourth lens group is moved to an object at infinity, a chief ray having the same angle of view as an image-taking angle view reaching the image height y0.7 upon focusing on infinity time intersects an imaging plane, and $\Delta s$ is 8*the maximum image height y1/1000, provided that y1, y0.7, y1', y0.7' and $\Delta s$ are all given in mm.

The requirements for, and the advantages of, the aforesaid arrangement for the zoom lens according to the second aspect of the invention are now explained.

By adoption of such a negative power leadoff type zoom lens having a lens group of negative refracting power located on the most object side, it is possible to set up a zoom lens that facilitates making sure an angle of view at the wide-angle end and works in favor of size and cost reductions. And the third lens group of negative refracting power is used as a focusing lens group thereby making it easy to hold back magnification changes upon defocusing as focusing (plus wobbling) takes place.

A zoom lens of such a lens-group-of-negative-refracting-power leadoff type works in favor of obtaining a small-format standard zoom lens or a wide-angle zoom lens. A positive power leadoff type zoom lens is apt to grow long in full length and large in the lens diameter of the first lens group. According to the second aspect of the invention, it is possible to provide a negative power leadoff type zoom lens that has curtailed full length and a reduced lens diameter.

In the second aspect of the invention, substantial zooming is implemented by the first lens group of negative refracting power and the second lens group of positive refracting power. To achieve the focusing mode that is capable of focusing (plus wobbling), however, there is the need for reducing the weight of the focusing lens group. It has been found that for the purpose of reducing sensitivity-to-focusing changes of the focusing group in a zooming state, it is preferable to locate the focusing lens group on an image side with respect to the second lens group. Referring specifically to the second aspect of the invention, the third lens group of negative refracting power is located on an image side with respect to the second lens group of positive refracting power, and focusing (plus wobbling prior to focusing) is implemented with the third lens group thereby reducing the weight of the focusing lens group. While the second and the third lens group may be designed to move in unison, it should be understood that if the separation between the respective $1^{st}$ to $4^{th}$ lens groups is changed, field curvature changes in association with zooming can then be reduced.

In the second aspect of the invention, the fourth lens group of positive refracting power is located on an image side of the third lens group. This fourth lens group has a function of spacing an exit pupil away from the image plane. Generally, imaging devices such as CCDs or CMOSs impose some limitations on the angle of incidence of incident rays; as the angle of incidence of rays grows too large, it will cause shading of rays. Accordingly, the exit pupil position must be somewhat far away from the imaging plane of the imaging device. As the fourth lens group is located according to the second aspect of the invention, an optical system from the first lens group up to the third lens group can have an exit pupil located at a relatively near position, with the result that the full lens length, viz., the length from the first lens group up to the image plane can be curtailed.

The zoom lens of the second aspect of the invention, because of having such an arrangement, enables image magnification changes to be much more reduced than a conventional zoom lens upon focusing (plus wobbling during the taking of moving images). The amount of image magnification changes differs with image heights; that amount cannot fully be reduced only with specific image heights, so it must be reduced throughout the screen.

Conditions (1) and (2) are provided for that purpose: they are conditions for determining the amount of image magnification changes relative to the defocus quantity. It is here noted that although differing with the value of defocus quantity $\Delta s$, calculation is made in terms of a defocus quantity equivalent to an allowed depth. Generally, the allowed depth may be represented by F-number* allowed diameter of circle of confusion. In the second aspect of the invention, however, the F-number is supposed to be equal to 8, and the allowed diameter of circle of confusion is supposed to be equal to the maximum image height (y1)/1000.

It may be relatively easy to satisfy either one of Conditions (1) and (2), but there is the need for satisfying both Conditions (1) and (2) so as to reduce the amount of image magnification changes throughout the screen, as contemplated herein. It has now been found that by satisfying both conditions, image magnification changes can be kept small even in other image height states. It has also been found that if image magnification changes occurring from defocusing are reduced at the wide-angle end, it then takes effect all over the zooming range, because image magnification changes relative to the defocus quantity on the telephoto side remain small. Exceeding the upper limits to Conditions (1) and (2) is not preferable because the amount of image magnification changes grows large.

FIG. 9 is illustrative in schematic of the definitions of the conditions for the zoom lens according to the second aspect of the invention. For convenience of illustration, the shape and number of lenses in each of the first to fourth lens groups are simplified, while the amount of movement of, and the optical path through, the third lens group also supposed to wobble are exaggerated.

The zoom lens according to the second aspect of the invention is built up of, in order from its object side to its image side (imaging plane), a first lens group of negative refracting power, a second lens group of positive refracting power, a third lens group of negative refracting power, and a fourth lens group of positive refracting power.

In FIG. 9, a light ray A is indicative of a chief ray incident on the position of the maximum image height (y1) at the imaging plane upon focusing on infinity, and a light ray B is indicative of a chief ray incident on a position (y0.7) seven-tenth of the maximum image height (y1) at the imaging plane upon focusing on infinity.

The zoom lens according to the second aspect of the invention is characterized in that the third lens group is moved for focusing or wobbling. In FIG. 9, a light ray A' is indicative of a displacement of the chief ray A as the third lens group has moved for focusing or wobbling to form an image at a position separate away from the imaging plane by the defocus quantity $\Delta s$.

In FIG. 9, a light ray B' is indicative of a displacement of a chief ray B as the third lens group has moved for focusing or wobbling to form an image at a position separate away from the imaging plane by the defocus quantity $\Delta s$. It is here noted that the defocus quantity $\Delta s$ is supposed to be 8*the maximum image height (y1)/1000, as already mentioned An image height where the ray A' is imaged at the imaging plane is defined by y1', and an image height where the ray B' is imaged at the imaging plane is defined by y0.7'.

The third lens group of negative refracting power works in favor of making sure weight reductions and sensitivity to focusing. In addition, although the separation between the third and the fourth lens group grows wide as the third lens group is let out, yet the height of incidence of the chief ray on the third lens group off the optical axis becomes so low that magnification changes on the imaging plane are canceled out. Therefore, it is easy to hold back magnification changes in association with the movement of the third lens group, and hold back magnification changes upon focusing (plus wobbling) operation. This favors especially the taking of moving images. Thus, the third lens group may be set up in the form of not only the focusing group but also the wobbling group that wobbles in the axial direction prior to focusing.

To obtain moving images of high quality on a large-screen TV or the like with stricter conditions imposed thereon, the following conditions (1-1)' and (2-1)' should more preferably be satisfied at the telephoto end:

$$|(100*(y1'-y1)/y1)|/\Delta s<0.7 \tag{1-1}$$

$$|(100*(y0.7'-y0.7)/y0.7)|/\Delta s<0.7 \tag{2-1}$$

Preferably, the first lens group remains fixed in position during zooming. This enables the full length of the zoom lens to be kept constant, working in favor of prevention of dust or dirt from entering it.

Preferably, the third lens group consists of two lenses at most, with one of the two being a negative lens. This works in favor of weight reductions, easing the third lens group of excessive loads on focusing plus wobbling.

More preferably for weight reductions, the third lens group should consist of a negative lens.

Alternatively, if the third lens group is made up of two lenses: a negative lens and a positive lens, it then works in favor of correction of chromatic aberrations, etc. at the third lens group. Especially as the positive lens and the negative lens are cemented together into a cemented lens, it works more in favor of correction of chromatic aberrations, etc., and in favor of a low-profile arrangement as well.

Preferably, the following Condition (14) is satisfied:

$$0.8<fbw/fw<1.8 \tag{14}$$

where fbw is the distance, as calculated on an air basis, from an image-side surface of a lens on the most image side of the zoom lens to the imaging plane upon focusing on infinity at the wide-angle end, and fw is the focal length of the whole zoom lens system upon focusing on infinity at the wide-angle end.

Locating the fourth lens group somewhat away from the image plane allows for a further full-length reduction. By locating the fourth lens group in such a way as to satisfy Condition (14), it is possible to locate an exit pupil at a position relatively near to the image plane in an optical system from the first lens group up to the third group with the result that the full lens length, viz., the length from the first lens group to the imaging plane can favorably be curtailed.

As the lower limit to Condition (14) is set at not less than 0.8, it makes sure the function of moving the exit pupil position, and facilitates prevention of interference of the zoom lens with parts within the imaging apparatus. As the upper limit to Condition (14) is set at not greater than 1.8, it facilitates prevention of an increase in the full length due to an excessive back focus.

Further, it is preferable to satisfy the following Conditions (5), (6), (7) and (8):

$$-2.5<f1/fw<-0.5 \tag{5}$$

$$0.5<f2/fw<2.5 \tag{6}$$

$$-5.0<f3/fw<-1.0 \tag{7}$$

$$2.0<f4/fw<10.0 \tag{8}$$

where fw is the focal length of the whole zoom lens system upon focusing on infinity at the wide-angle end,
f1 is the focal length of the first lens group,
f2 is the focal length of the second lens group,
f3 is the focal length of the third lens group, and
f4 is the focal length of the fourth lens group.

Condition (5) relates to the preferable refracting power of the first lens group. As the second, third and fourth lens groups are set in such a way as to provide life-size imaging in the vicinity of an intermediate focal length, full-length changes can be held back all over the zooming range from the wide-angle end to the telephoto end.

It is preferable to set the lower limit to Condition (5) at not less than -2.5, because the refracting power of the first lens group is ensured enough to curtail the full length of the zoom lens at the wide-angle end, contributing to size reductions. As the upper limit to Condition (5) is set at not greater than -0.5, it facilitates keeping the refracting power of the first lens group from getting excessive thereby curtailing the full length of the zoom lens on the telephoto side and, at the same time, achieving a lower lenses count for the purpose of holding back the aberrations of the first lens group.

Condition (6) relates to the preferable refracting power of the second lens group. As the lower limit to Condition (6) is set at not less than 0.5 so as to reduce the refracting power of the second lens group, it works in favor of aberration correction at the second lens group. As the upper limit to Condition (6) is set at not greater than 2.5 so as to make sure the refracting power of the second lens group, it enables the amount of movement of the second lens group for zooming to be reduced, working in favor of size reductions.

Condition (7) relates to the preferable refracting power of the third lens group. As the lower limit to Condition (7) is set at not less than −5.0 so as to make sure the refracting power of the third lens group, it allows for a decrease in the amount of movement of the third lens group for focusing (plus wobbling). With that, there is a narrowing of the movable space, which works in favor of a curtailing of the whole zoom lens size. As the upper limit to Condition (7) is set at not greater than −1.0 so as to reduce the refracting power of the third lens group, it holds back aberration fluctuations in association with focusing while there is a low lenses count of the third lens group.

Condition (8) relates to the preferable refracting power of the fourth lens group. As the lower limit to Condition (8) is set at not less than 2.0 so as to reduce the refracting power of the fourth lens group, it enables aberrations occurring at the fourth lens group to be decreased enough to make aberration correction easy throughout the zoom lens. As the upper limit to Condition (8) is set at not greater than 10.0 so as to make sure the refracting power of the fourth lens group, it works in favor of making sure the function of locating the exit pupil far away.

Preferably, the second lens group comprises a plurality of lenses, wherein an aperture stop is located on an object side with respect to a position where an air separation between the lenses in the second lens group becomes the widest.

The lens near the aperture stop corrects mainly spherical aberrations, and the lens on an image side with respect to it and at a suitable distance corrects off-axis aberrations. Locating the lenses on an image side with respect to the aperture stop with a space between them favors proper correction of axial aberrations and off-axis aberrations.

Preferably, the aperture stop moves in unison with the second lens group during zooming. This works in favor of size reductions of the second lens group in the diametrical direction.

Preferably, the arrangement of the second lens group satisfies the following Condition (15):

$$0.08 < d2m/dG2 < 0.5 \tag{15}$$

where d2m is the maximum value of the air separation distance between the lenses in the second lens group, and dG2 is the axial thickness of the second lens group from the object-side refracting surface to the image-side refracting surface.

Condition (15) defines the preferable ratio between the maximum lens-to-lens separation in the second lens group and the thickness of the second lens group. As the lower limit to Condition (15) is set at not less than 0.08 so as to make sure the separation, it works in favor of aberration correction while the lenses count is kept low. As the upper limit to Condition (15) is set at not greater than 0.5 so as to make the separation narrow, it works in favor of size reductions of the second lens group.

It is preferable to satisfy the following Condition (11):

$$8.0 < y1 < 25.0 \tag{11}$$

where y1 is the maximum image height at the imaging plane throughout the zoom lens.

As the lower limit to Condition (11) is set at not less than 8.0 so as to make sure the desired imaging area, it facilitates prevention of signal noises upon high-sensitivity image shooting. In addition, this leads to an increase in the amount of focusing (plus wobbling) movement, facilitating control. As the upper limit to Condition (11) is set at not greater than 25.0, it results in prevention of any increase in the imaging area, and facilitates prevention of the zoom lens from getting bulkier. In addition, this helps reduce the size of the lens for carrying out focusing (plus wobbling), resulting in power savings.

Preferably, the fourth lens group remains fixed in position during zooming, because the mechanisms involved can not only be simplified but also influences of dust and dirt can be kept in check. This is also preferable because it is easy to hold back image magnification changes as focusing or wobbling takes place by the movement of the third lens group.

Preferably, the third lens group moves to the image side upon focusing from a focusing-on-infinity state to a close-range focusing state, wherein the second lens group and the third lens group move to the object side upon zooming from the wide-angle end to the telephoto end.

Such an arrangement allows for size reductions of the third lens group in the diametrical direction while holding back aberration fluctuations. This is also preferable because it is easy to reduce image magnification changes during focusing (plus wobbling) operation.

The second aspect of the invention provides a negative-lens-group leadoff type zoom lens that works in favor of making sure the desired zoom ratio, shading reductions, and focusing or wobbling, and for that zoom lens it is preferable to satisfy the following Conditions (12) and (13).

$$2.5 < ft/fw < 7.0 \tag{12}$$

$$35° < \omega w < 50° \tag{13}$$

where fw is the focal length of the whole zoom lens system upon focusing on infinity at the wide-angle end, ft is the focal length of the whole zoom lens system upon focusing on infinity at the telephoto end, and ωw is the maximum half angle of view of the whole zoom lens system upon focusing on infinity at the wide-angle end.

These conditions are provided for the purpose of determining the zoom lens specifications preferable for the inventive lens arrangement. More specifically, Condition (12) is provided for the purpose of determining the preferable zoom ratio. It is preferable to set the lower limit to Condition (12) at not less than 2.5, because of achieving any desired zoom ratio well compatible with a variety of photographic scenes. As the upper limit to Condition (12) is set at not greater than 7.0, it works in favor of aberration fluctuation reductions and making sure brightness at the telephoto end.

Condition (13) is provided to determine the preferable half angle of view at the telephoto end. It is preferable to set the lower limit at not less than 35° so as to make sure any desired angle of view. As the upper limit is set at not greater than 50°, it enables the angle of view to be properly kept, working in favor of off-axis aberration reductions.

The present invention may also provide an imaging apparatus equipped with any one of the zoom lenses as described above and an imaging device.

It is here noted that unless otherwise defined, the arrangements according to the second aspect of the invention are all supposed to be in the focusing-on-infinity state. It is also noted that two or more requirements for the arrangements as described above should more preferably be satisfied at the same time.

More preferably for each condition in the second aspect of the invention, further limitations should be added to the upper and lower limit values. By using such upper and lower limit values, much more enhanced advantages could be obtained.

To Conditions (1) and (1-1), the upper limit value should more preferably be set at 0.6, especially 0.4.

To Conditions (2) and (2-1), the upper limit value should more preferably be set at 0.6, especially 0.4.

To Condition (14), the lower limit value should more preferably be set at 1.0, and the upper limit value should more preferably be set at 1.4.

To Condition (5), the lower limit value should more preferably be set at −2.0, and the upper limit value should more preferably be set at −1.0.

To Condition (6), the lower limit value should preferably be set at 1.0, and the upper limit value should more preferably be set at 2.0.

To Condition (7), the lower limit value should more preferably be set at −4.0, and the upper limit value should more preferably be set at −2.5.

To Condition (8), the lower limit value should more preferably be set at 3.0, and the upper limit value should more preferably be set at 8.0.

To Condition (15), the lower limit value should more preferably be set at 0.1, especially 0.2, and the upper limit value should more preferably be set at 0.4.

To Condition (11), the lower limit value should more preferably be set at 10.0, and the upper limit value should more preferably be set at 20.0, especially 15.0.

It is here noted that in addition to the second aspect of the invention, there are two additional aspects of the invention mentioned below, which may also satisfy such various requirements and limitations as described in the second aspect of the invention.

The present invention provides a zoom lens comprising, in order from an object side thereof, a first lens group of negative refracting power,
a second lens group of positive refracting power,
a third lens group of negative refracting power, and
a fourth lens group of positive refracting power, characterized in that:

upon zooming from a wide-angle end to a telephoto end thereof, a separation between the respective lens groups changes, and upon wobbling and upon focusing from a focusing-on-infinity state to a close-range focusing state, the third lens group moves in an optical axis direction, with satisfaction of the following Conditions (5), (6), (7) and (8):

$$2.5 < f1/fw < -0.5 \tag{5}$$

$$0.5 < f2/fw < 2.5 \tag{6}$$

$$-5.0 < f3/fw < -1.0 \tag{7}$$

$$2.0 < f4/fw < 10.0 \tag{8}$$

where fw is the focal length of the whole zoom lens system upon focusing on infinity at the wide-angle end, f1 is the focal length of the first lens group,
f2 is the focal length of the second lens group,
f3 is the focal length of the third lens group, and
f4 is the focal length of the fourth lens group.

The present invention provides a zoom lens comprising, in order from an object side thereof, a first lens group of negative refracting power,
a second lens group of positive refracting power,
a third lens group of negative refracting power, and
a fourth lens group of positive refracting power, characterized in that:

upon zooming from a wide-angle end to a telephoto end thereof, a separation between the respective lens groups changes, upon wobbling and upon focusing from a focusing-on-infinity state to a close-range focusing state, the third lens group moves in an optical axis direction, the second lens group includes a plurality of lenses, and an aperture stop is located on an object side with respect to a position where an air separation between the lenses in the second lens group becomes the widest, with satisfaction of the following Condition (15):

$$0.1 < d2m/dG2 < 0.5 \tag{15}$$

where d2m is the maximum value of an air separation distance between the lenses in the second lens group, and dG2 is an axial thickness of the second lens group from an object-side refracting surface to an image-side refracting surface.

According to the present invention, there can be a zoom lens provided, which is of small-format size and well fit for the taking of moving images.

Still other objects and advantages of the invention will in part be obvious and will in par be apparent from the specification.

The invention accordingly comprises the features of construction, combinations of elements, and arrangement of parts which will be exemplified in the construction hereinafter set forth, and the scope of the invention will be indicated in the claims.

DETAILED DESCRIPTION OF THE PREFERRED EMBODIMENTS

Mode for Carrying Out the Invention

Figure 1:
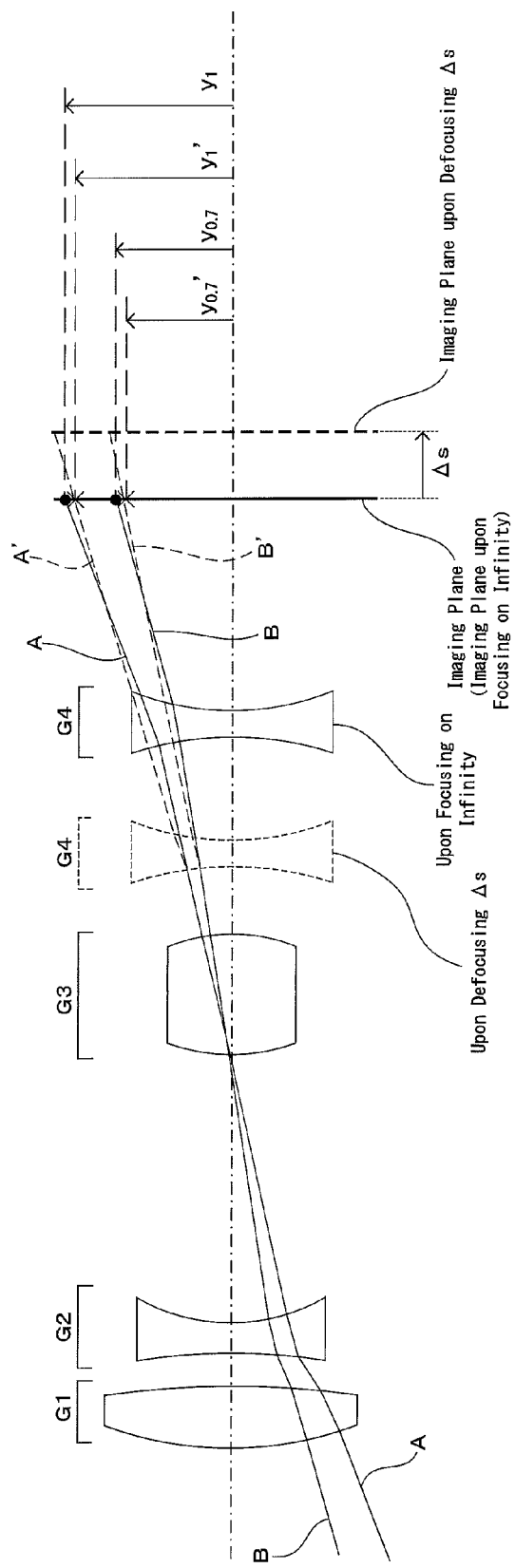
FIG. 1 is illustrative in schematic of the definitions of the conditions for the zoom lens according to the first aspect of the invention.
Figure 2:
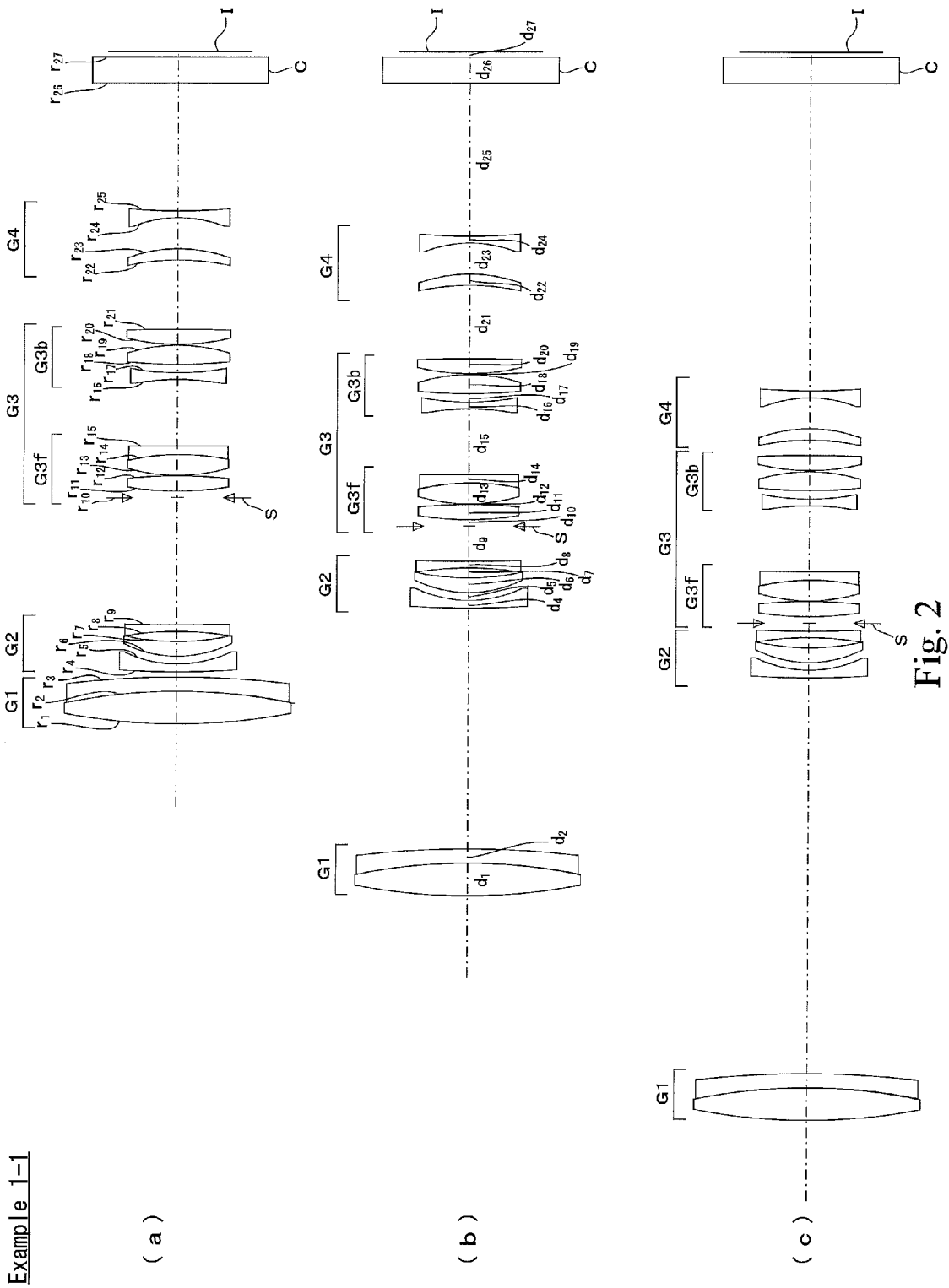
FIG. 2 is a sectional view of the zoom lens of Example 1-1 according to the first aspect of the invention, as taken apart along the optical axis.
Figure 3:
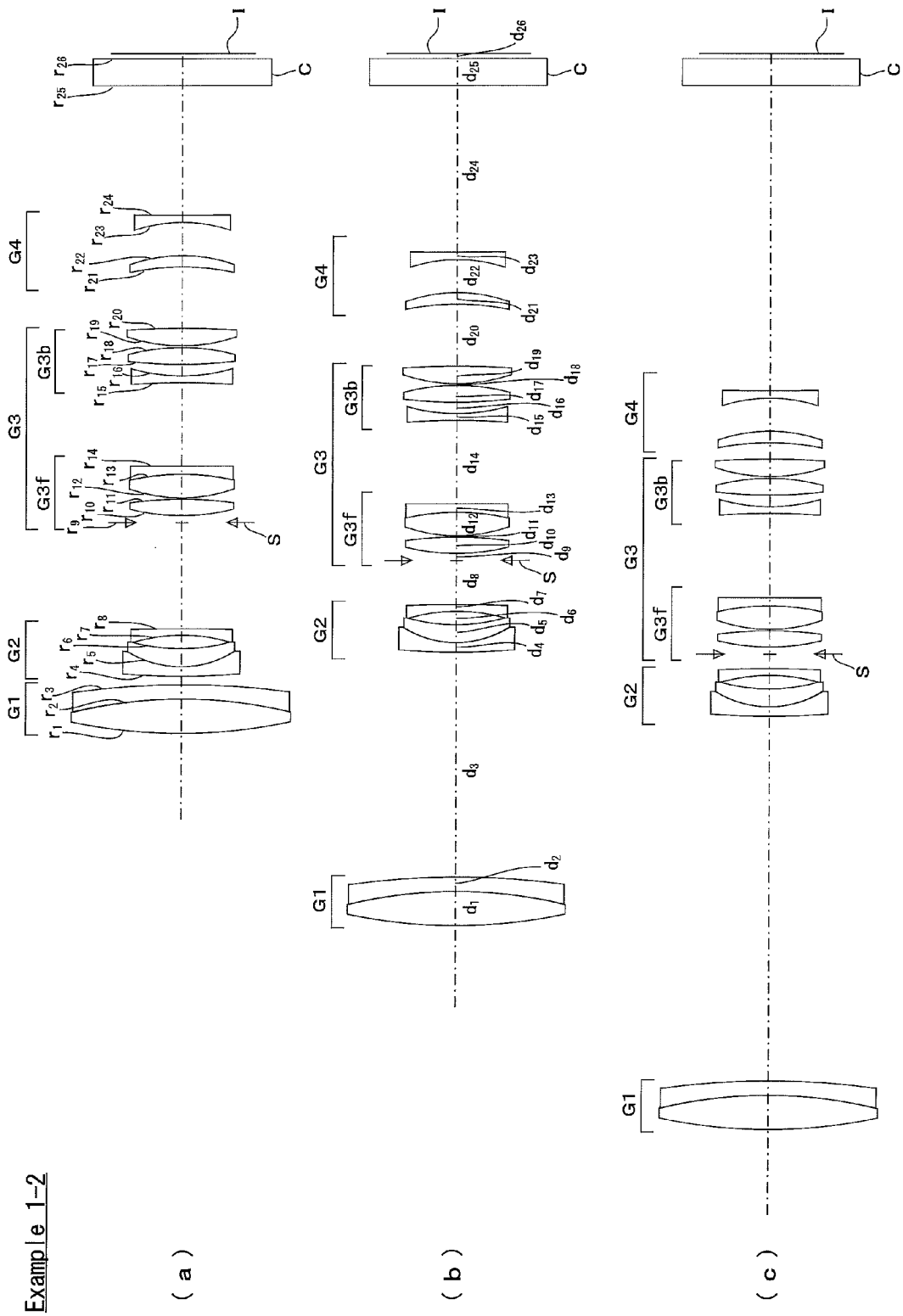
FIG. 3 is a sectional view of the zoom lens of Example 1-2 according to the first aspect of the invention, as taken apart along the optical axis.

The zoom lenses of Examples 1-1 and 1-2 according to the first aspect of the invention are now explained with reference to the drawings. FIGS. 2 and 3 are sectional views of the zoom lenses of Examples 1-1 and 1-2 according to the first aspect of the invention as taken apart along the optical axis. In FIGS. 2 and 3, (a), (b) and (c) stand for the wide-angle end (WE), an intermediate state (ST) and the telephoto end (TE), respectively.

EXAMPLE 1-1

FIG. 2 is a sectional view of the zoom lens of Example 1-1. As shown in FIG. 2, the zoom lens of Example 1-1 is built up of, in order from the object side to the image side, a first lens group G1 of positive refracting power, a second lens group G2 of negative refracting power, a third lens group G3 of positive refracting power, and a fourth lens group G4 of negative refracting power. In FIG. 2, I and C are indicative of an image plane and a cover glass, respectively.

The first lens group G1 is made up of a cemented lens of a positive lens and a negative lens.

The second lens group G2 is made up of, in order from the object side to the image side, a negative lens, a positive lens and a negative lens.

The third lens group G3 is made up of, in order from the object side to the image side, a stop S, a front unit G3$f$ consisting of a positive lens and a cemented lens of a positive lens and a negative lens, and a rear unit G3$b$ consisting of a negative lens, a positive lens and a positive lens.

The fourth lens group G4 is made up of a positive meniscus lens convex on its image side and a negative lens.

Referring to the operation of the zoom lens of Example 1-1, the first, second, third and fourth lens groups G1, G2, G3 and G4 move independently for zooming operation. The focusing operation, and the wobbling operation is implemented by the fourth lens group G4. Upon focusing from infinity to a near distance, the fourth lens group G4 moves to the image side.

Upon zooming from the wide-angle end to the telephoto end, the first lens group G1 moves to the object side while the separation between it and the second lens group G2 grows wide.

Upon zooming from the wide-angle end to the telephoto end, the second lens group G2 moves to the object side just as it draws a concave orbit while the separation between it and the third lens group G3 becomes narrow.

Upon zooming from the wide-angle end to the telephoto end, the third lens group G3 moves in such a way that once the separation between it and the fourth lens group G4 grows wide, it becomes narrow.

Upon zooming from the wide-angle end to the telephoto end, the fourth lens group G4 moves to the object side.

EXAMPLE 1-2

FIG. 3 is a sectional view of the zoom lens of Examples 1-2. As shown in FIG. 3, the zoom lens of Example 1-2 is built up of, in order from the object side to the image side, a first lens group G1 of positive refracting power, a second lens group G2 of negative refracting power, a third lens group G3 of positive refracting power, and a fourth lens group G4 of negative refracting power. In FIG. 3, I and C are indicative of an image plane and a cover glass, respectively.

The first lens group G1 is made up of a cemented lens of a positive lens and a negative meniscus lens.

The second lens group G2 is made up of, in order from the object side to the image side, a cemented lens of a negative lens and a positive lens, and a negative lens.

The third lens group G3 is made up of, in order from the object side to the image side, a stop S, a front unit G3$f$ consisting of a positive lens and a cemented lens of a positive lens and a negative lens, and a rear unit G3$b$ consisting of a negative lens, a positive lens and a positive lens.

The fourth lens group G4 is made up of a positive meniscus lens convex on its image side and a negative lens.

Referring to the operation of the zoom lens of Example 1-2, the first, second, third and fourth lens groups G1, G2, G3 and G4 move independently for zooming operation. The focusing operation, and the wobbling operation is implemented by the fourth lens group G4. Upon focusing from infinity to a near distance, the fourth lens group G4 moves to the image side.

Upon zooming from the wide-angle end to the telephoto end, the first lens group G1 moves to the object side while the separation between it and the second lens group G2 grows wide.

Upon zooming from the wide-angle end to the telephoto end, the second lens group G2 moves to the object side just as it draws a concave orbit while the separation between it and the third lens group G3 becomes narrow.

Upon zooming from the wide-angle end to the telephoto end, the third lens group G3 moves in such a way that once the separation between it and the fourth lens group G4 grows wide, it becomes narrow.

Upon zooming from the wide-angle end to the telephoto end, the fourth lens group G4 moves to the object side.

NUMERAL EXAMPLES

Set out below are data sets of Examples 1-1 and 1-2 such as surface data, variable separation data, data set 1 and data set 2.

The surface data include the radius of curvature r of the lens surface for each surface No., the surface separation d, the d (587.6 nm)-line refractive index nd of each lens (optical medium), and the d-line Abbe constant vd of each lens (optical medium). The radius of curvature r and surface separation d are given in mm. In the surface data, the asterisk * affixed to the right side of the surface No. indicates that the lens surface is of aspheric shape, and ∞ in the radius of curvature column is indicative of infinity.

Data set 1 includes a variety of zoom data at the wide-angle end (WE), in the intermediate setting (ST) and at the telephoto end (TE). The zoom data include focal lengths, F-numbers (Fno), angles of vies (2ω), image heights, back focuses (BF), and variable surface separations d, and data set 2 includes focal lengths f1 to f4 of the first to fourth lens groups.

Numeral Example 1-1

| Surface No. | r | d | nd | vd |
|---|---|---|---|---|
| 1 | 87.805 | 5.000 | 1.51633 | 64.14 |
| 2 | −87.805 | 2.100 | 1.78472 | 25.68 |
| 3 | −178.563 | d3 (Variable) | | |
| 4 | 107.059 | 1.130 | 1.72916 | 54.68 |
| 5 | 18.723 | 1.247 | | |
| 6 | 19.754 | 2.205 | 1.84666 | 23.78 |
| 7 | 40.830 | 1.481 | | |
| 8 | −47.239 | 1.020 | 1.78800 | 47.37 |
| 9 | 340.768 | d9 (Variable) | | |
| 10 (Stop) | ∞ | 0.900 | | |
| 11 | 36.669 | 2.276 | 1.49700 | 81.54 |
| 12 | −101.134 | 0.150 | | |
| 13 | 26.352 | 3.170 | 1.48749 | 70.23 |
| 14 | −39.131 | 1.200 | 1.91082 | 35.25 |
| 15 | 401.570 | 10.124 | | |
| 16 | −40.884 | 0.950 | 1.83400 | 37.16 |
| 17 | 33.793 | 1.277 | | |
| 18 | 63.406 | 2.973 | 1.60311 | 60.64 |
| 19 | −25.058 | 0.150 | | |
| 20 | 35.694 | 2.290 | 1.77250 | 49.60 |
| 21 | −128.815 | d21 (Variable) | | |
| 22 | −37.415 | 1.700 | 1.59270 | 35.31 |
| 23 | −22.381 | 4.700 | | |
| 24 | −19.390 | 1.000 | 1.60311 | 60.64 |
| 25 | 86.781 | d25 (Variable) | | |
| 26 | ∞ | 4.000 | 1.51633 | 64.14 |
| 27 | ∞ | 0.800 | | |
| Image Plane | ∞ | | | |

| | WE | ST | TE |
|---|---|---|---|
| Data Set 1 | | | |
| Focal length | 40.804 | 77.526 | 147.015 |
| Fno | 4.08 | 4.45 | 5.87 |
| 2ω (°) | 30.41 | 15.69 | 8.30 |
| Image Height | 10.82 | 10.82 | 10.82 |
| BF | 22.819 | 26.667 | 49.994 |
| d3 | 0.800 | 36.336 | 60.036 |
| d9 | 19.251 | 5.300 | 1.022 |
| d21 | 10.473 | 10.957 | 2.294 |
| d25 | 19.380 | 23.228 | 46.555 |
| Data Set 2 | | | |
| f1 | 139.30 | | |
| f2 | −35.21 | | |
| f3 | 29.05 | | |
| f4 | −38.89 | | |

Numeral Example 1-2

| Surface No. | r | d | nd | vd |
|---|---|---|---|---|
| 1 | 88.502 | 5.100 | 1.51633 | 64.14 |
| 2 | −69.916 | 2.100 | 1.80518 | 25.42 |
| 3 | −130.441 | d3 (Variable) | | |
| 4 | 89.512 | 1.500 | 1.72916 | 54.68 |
| 5 | 15.466 | 2.650 | 1.80810 | 22.76 |
| 6 | 30.504 | 2.010 | | |
| 7 | −30.352 | 1.020 | 1.77250 | 49.60 |
| 8 | −327.681 | d8 (Variable) | | |
| 9 (Stop) | ∞ | 1.000 | | |
| 10 | 34.760 | 2.468 | 1.49700 | 81.54 |
| 11 | −83.968 | 0.200 | | |
| 12 | 23.409 | 3.514 | 1.48749 | 70.23 |
| 13 | −38.261 | 1.150 | 1.90366 | 31.32 |
| 14 | 197.372 | 12.654 | | |
| 15 | −94.069 | 0.980 | 1.72342 | 37.95 |
| 16 | 24.369 | 1.644 | | |
| 17 | 61.320 | 2.598 | 1.60311 | 60.64 |
| 18 | −39.599 | 0.200 | | |
| 19 | 26.200 | 2.689 | 1.77250 | 49.60 |
| 20 | −284.030 | d20 (Variable) | | |
| 21 | −40.239 | 1.680 | 1.67270 | 32.10 |
| 22 | −24.829 | 5.000 | | |
| 23 | −22.056 | 1.000 | 1.74100 | 52.64 |
| 24 | 153.489 | d24 (Variable) | | |
| 25 | ∞ | 4.000 | 1.51633 | 64.14 |
| 26 | ∞ | 0.800 | | |
| Image Plane | ∞ | | | |

| | WE | ST | TE |
|---|---|---|---|
| Data Set 1 | | | |
| Focal length | 40.800 | 77.523 | 147.004 |
| Fno | 4.08 | 4.56 | 5.91 |
| 2ω (°) | 30.79 | 15.83 | 8.33 |
| Image Height | 10.82 | 10.82 | 10.82 |
| BF | 22.951 | 28.633 | 49.431 |
| d3 | 1.200 | 33.640 | 54.683 |
| d8 | 15.853 | 6.439 | 2.100 |
| d20 | 9.224 | 9.389 | 2.516 |
| d24 | 19.513 | 25.195 | 45.993 |
| Data Set 2 | | | |
| f1 | 127.83 | | |
| f2 | −28.11 | | |
| f3 | 28.72 | | |
| f4 | −38.15 | | |

Figure 4:
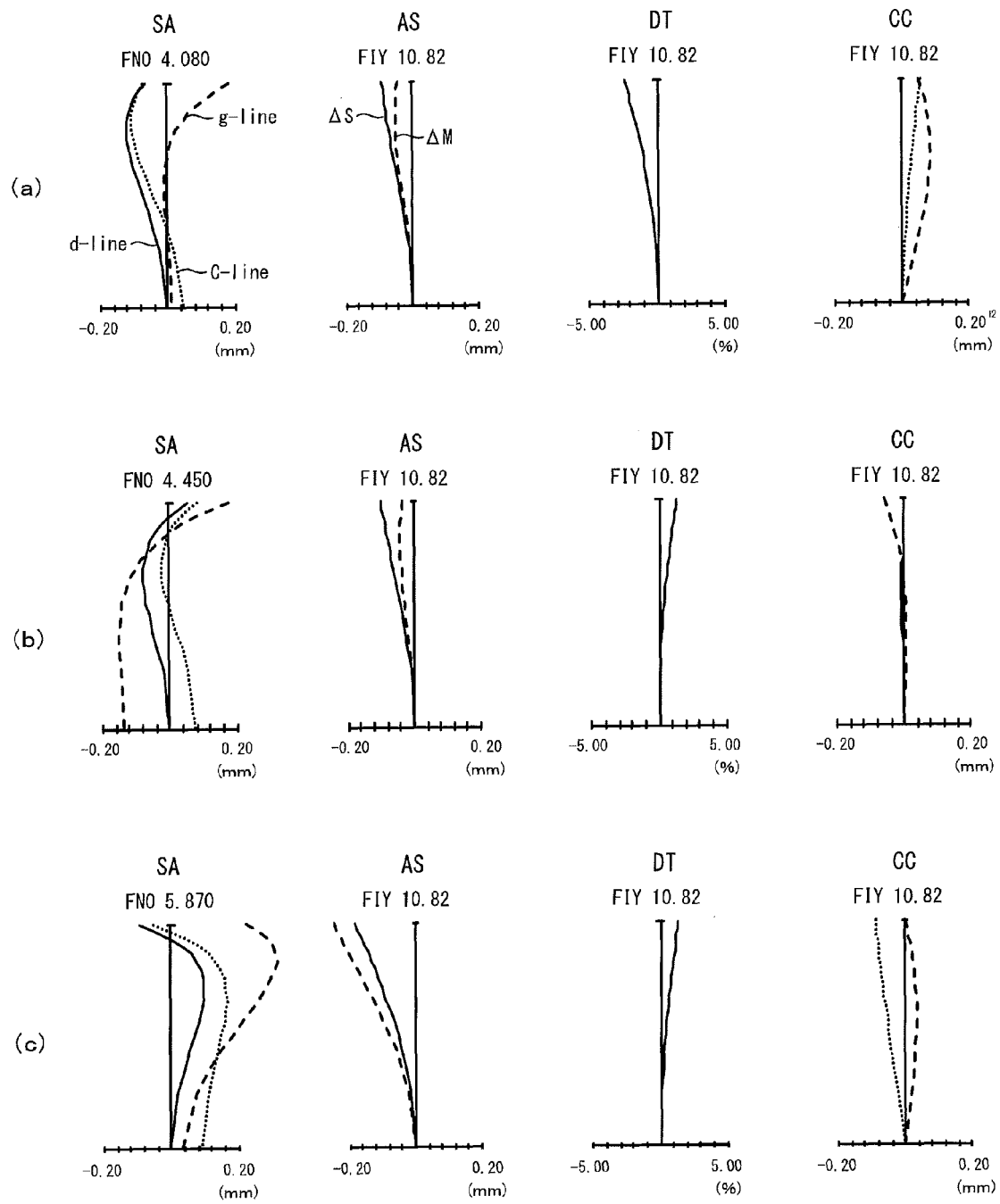
FIG. 4 is an aberration diagram for the zoom lens of Example 1-1 according to the first aspect of the invention.
Figure 5:
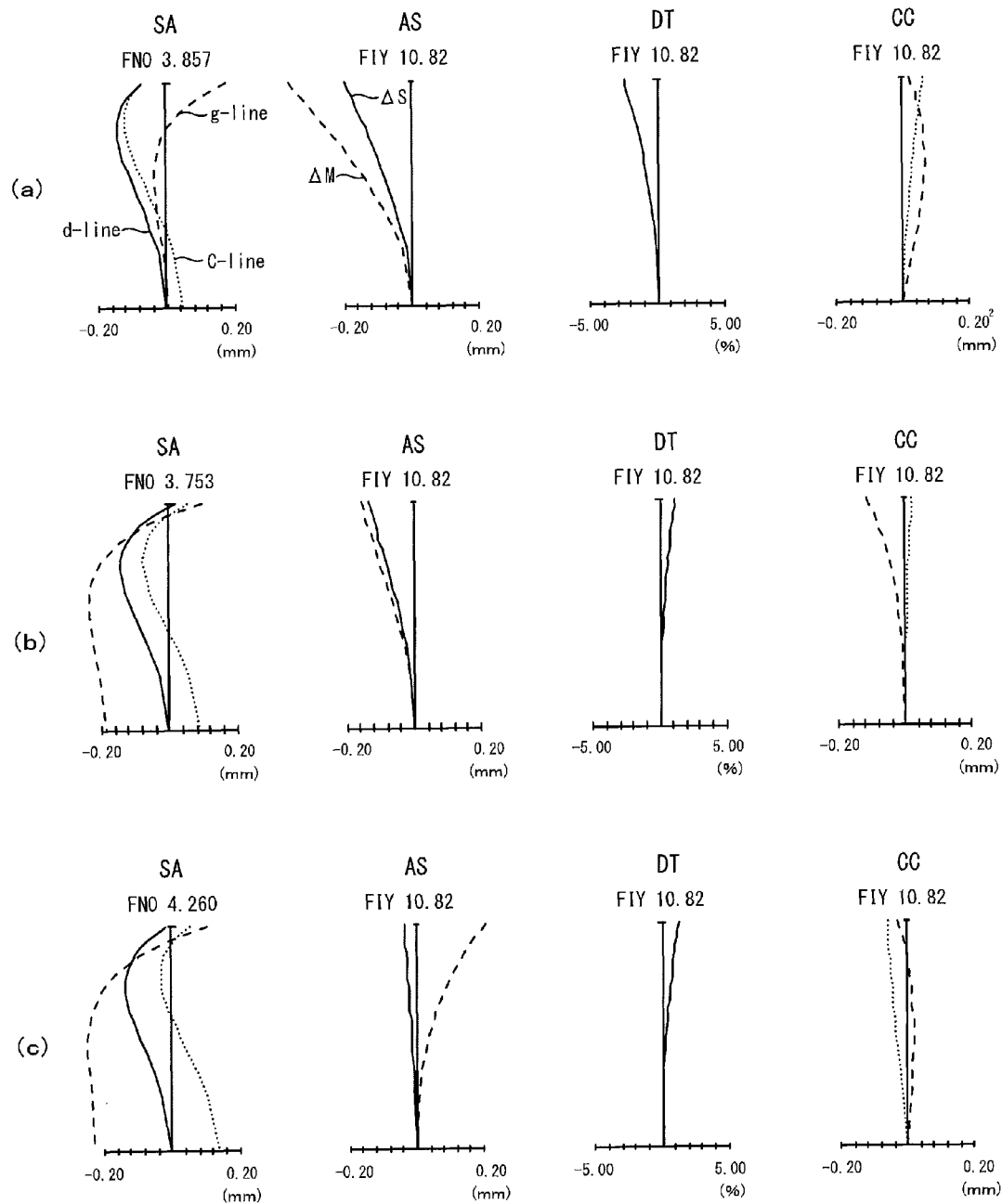
FIG. 5 is an aberration diagram for the zoom lens of Example 1-1 according to the first aspect of the invention.
Figure 6:
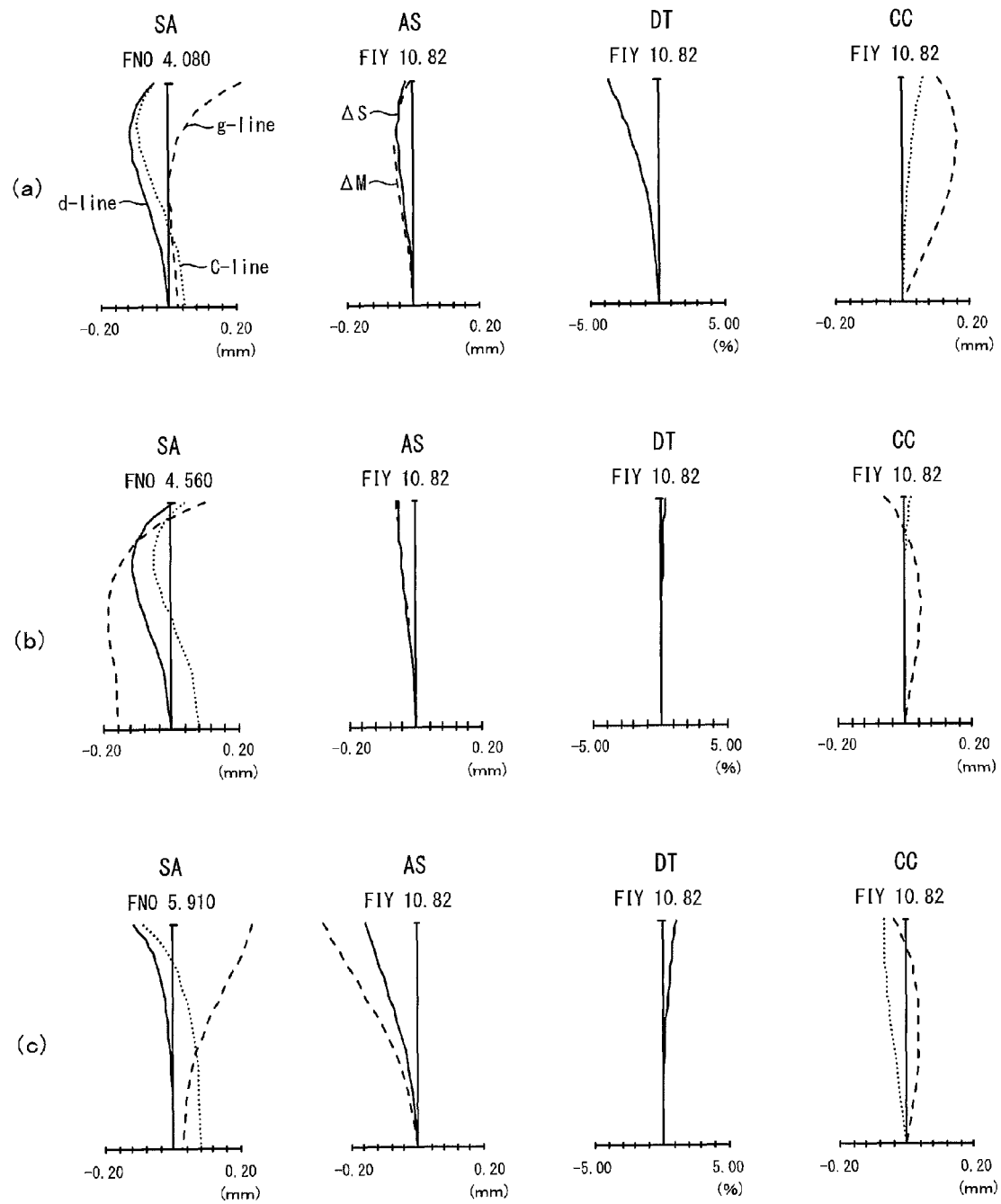
FIG. 6 is an aberration diagram for the zoom lens of Example 1-2 according to the first aspect of the invention.
Figure 7:
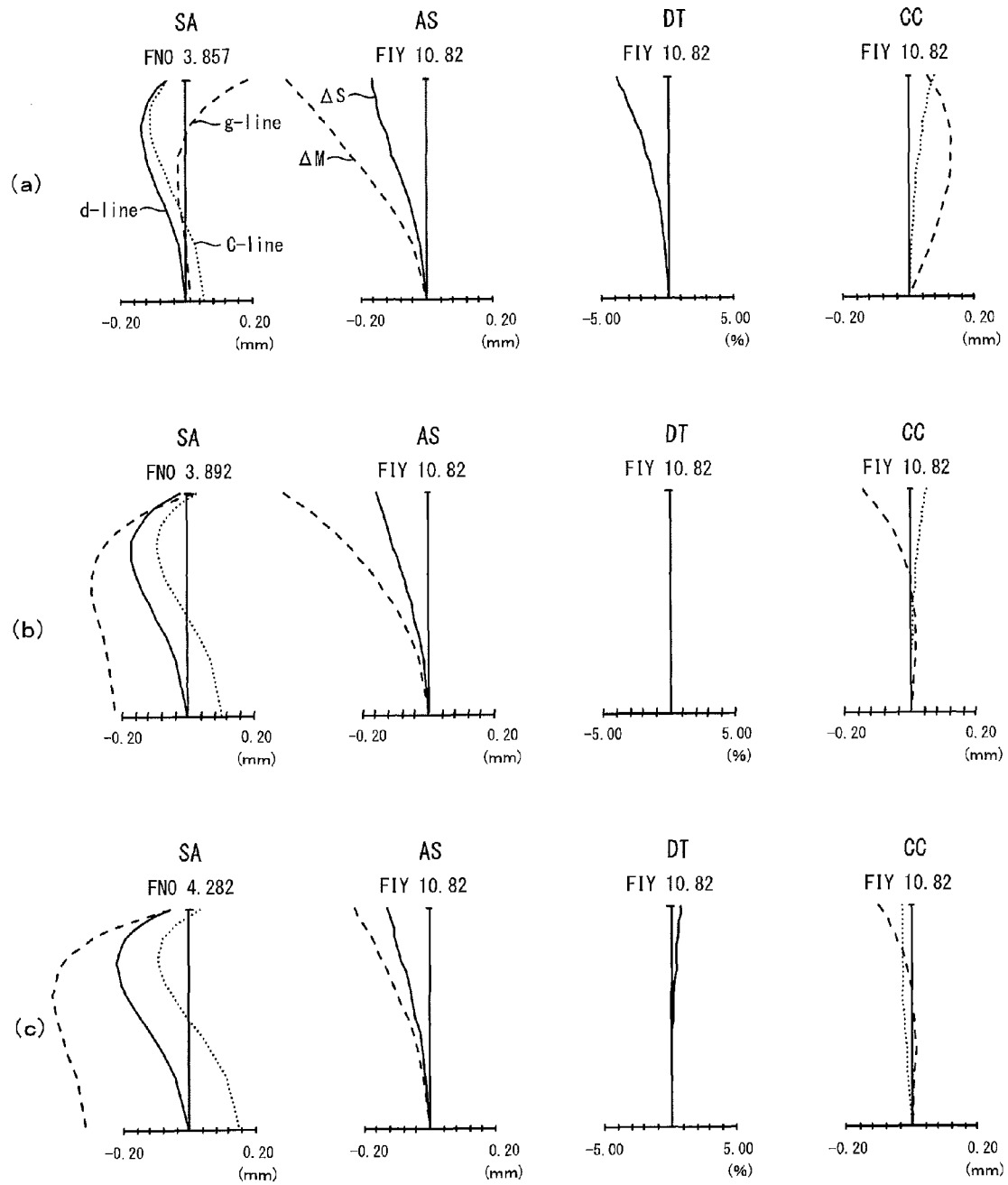
FIG. 7 is an aberration diagram for the zoom lens of Example 1-2 according to the first aspect of the invention.

FIGS. 4 and 6 are aberration diagrams for Examples 1-1 and 1-2 on an infinite object point (a) at the wide-angle end (WE), (b) in the intermediate setting (ST), and (c) at the telephoto end (TE), respectively, and FIGS. 5 and 7 are aberration diagrams for Examples 1-1 and 1-2 in an object distance of 0.9 m (a) at the wide-angle end (WE), (b) in the intermediate setting (ST), and (c) at the telephoto end (TE), respectively.

In those aberration diagrams, SA, AS, DT and CC stand for spherical aberrations, astigmatism, distortion and chromatic aberration of magnification, respectively. Given are spherical aberrations SA at the respective wavelengths of 587.6 mm (d-line: a solid line), 435.8 nm (g-line: a broken line) and 656.3 nm (C-line: a dotted line), and chromatic aberrations of magnification CC at the respective wavelengths of 435.8 nm (g-line: a broken line) and 656.3 nm (C-line: a dotted line) on a d-line basis. Astigmatisms DT are given with the meridional image plane as a solid line and the sagittal image plane as a broken line. Note here that FNO and FIY are indicative of an F-number and the maximum image height, respectively.

Tabulated below are the values of Conditions (1) to (13) in Examples 1-1 and 1-2.

|  | Examples 1-1 | Examples 1-2 |
| --- | --- | --- |
| Condition (1) | 0.66 | 0.78 |
| Condition (2) | 0.65 | 0.76 |
| Condition (3) | 0.95 | 0.95 |
| Condition (4) | 0.35 | 0.44 |
| Condition (5) | 3.41 | 3.13 |
| Condition (6) | −0.86 | −0.69 |
| Condition (7) | 0.71 | 0.70 |
| Condition (8) | −0.95 | −0.94 |
| Condition (9) | 0.010 | 0.068 |
| Condition (10) | 25.30 | 20.50 |
| Condition (11) | 10.82 | 10.82 |
| Condition (12) | 3.60 | 3.60 |
| Condition (13) | 15.21 | 15.40 |

Figure 8:
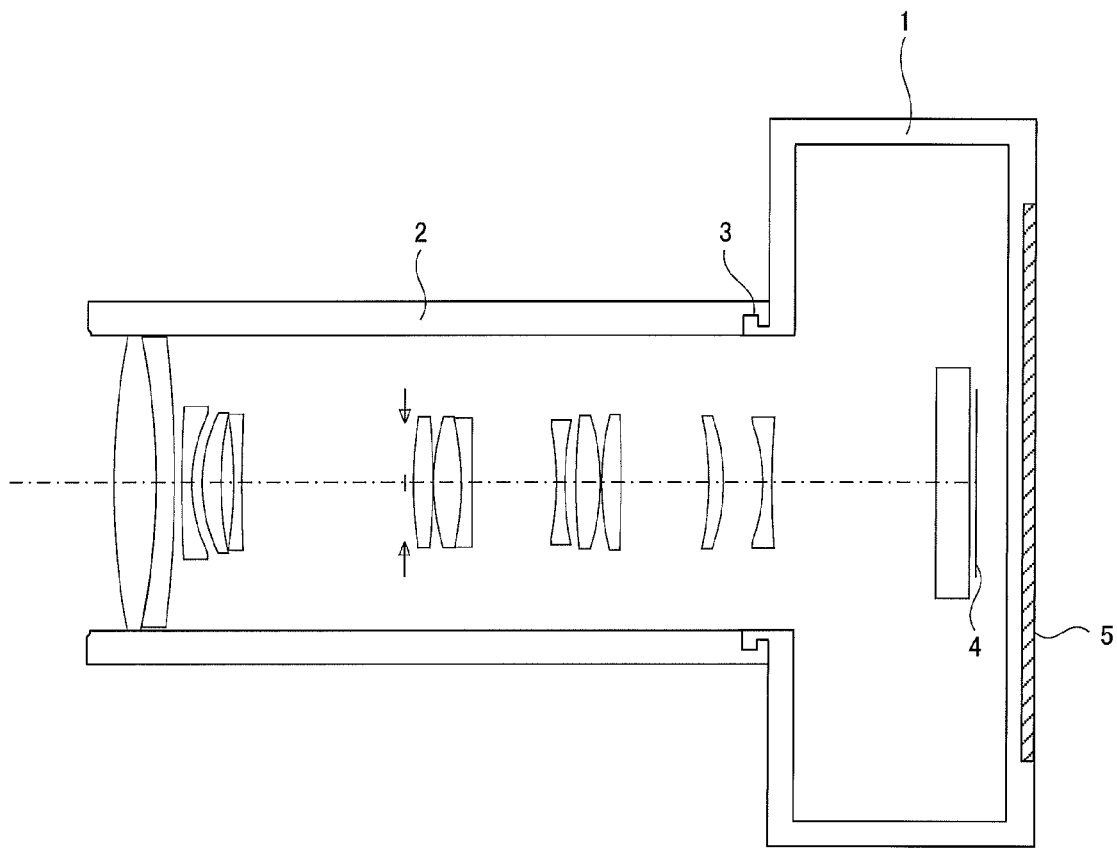
FIG. 8 is a sectional view of an imaging apparatus using the zoom lens according to the first aspect of the invention in the form of an interchangeable lens.
Figure 9:
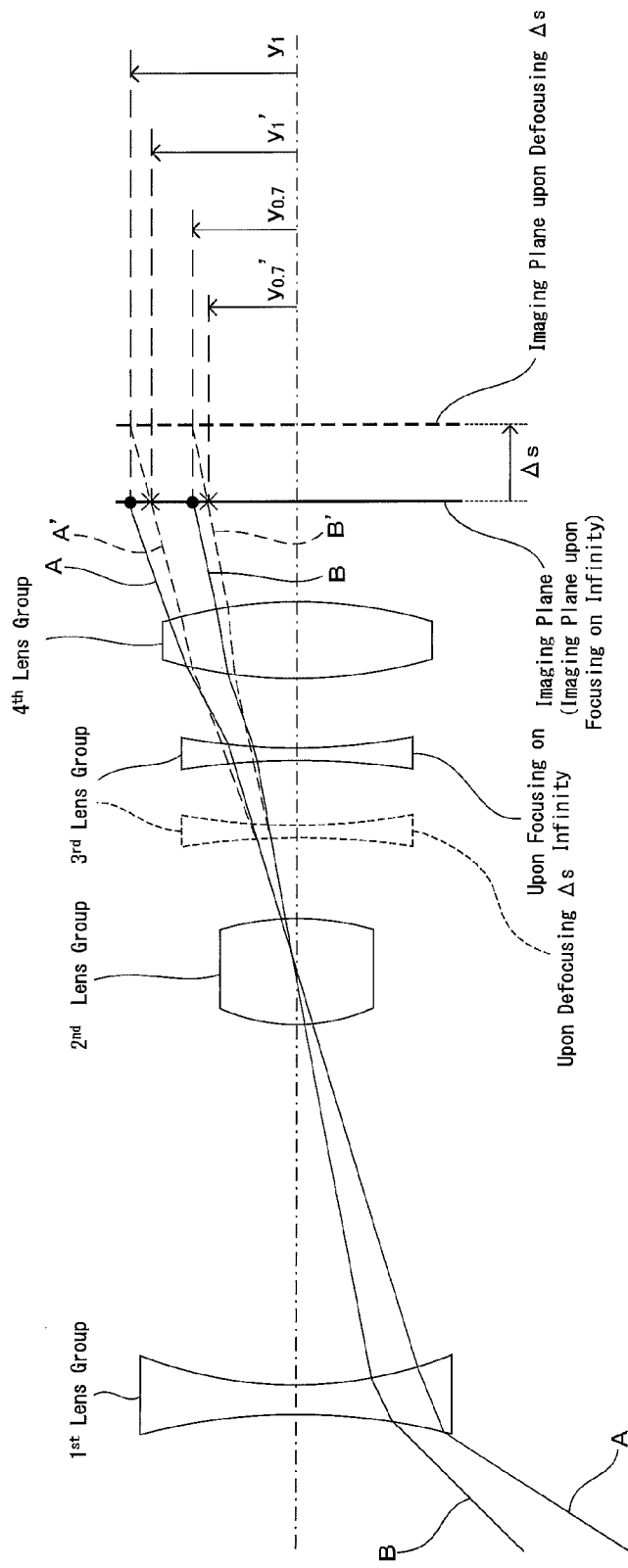
FIG. 9 is illustrative in schematic of the definitions of the conditions for the zoom lens according to the second aspect of the invention.

FIG. 8 is a sectional view of a single-lens mirrorless camera that is one example of the imaging apparatus that uses the zoom lens according to the first aspect of the invention and incorporates a small-format CCD, CMOS or the like as an imaging device. In FIG. 8, reference numeral 1 is a single-lens mirrorless camera; 2 is an imaging lens system located within a lens barrel; and 3 is a lens barrel mount for making the imaging lens system 2 attachable to or detachable from the single-lens mirrorless camera 1. For that lens mount, for instance, a screw or bayonet type mount may be used. The bayonet type mount is herein used. Reference numerals 4 and 5 are an imaging device plane and a back monitor, respectively.

As the imaging lens system 2 in the thus assembled single-lens mirrorless camera 1, for instance, the zoom lens according to the first aspect of the invention set forth in Example 1-1 or 1-2 may be used.

The zoom lenses of Examples 2-1 to 2-4 according to the second aspect of the invention are now explained with reference to the drawings. FIGS. 10 to 13 are sectional views of the zoom lenses of Examples 2-1 to 2-4 according to the second aspect of the invention, as taken apart along the optical axis. In FIGS. 10 to 13, (a), (b) and (c) are indicative of the wide-angle end (WE), the intermediate setting (ST) and the telephoto end (TE), respectively.

EXAMPLE 2-1

Figure 10:
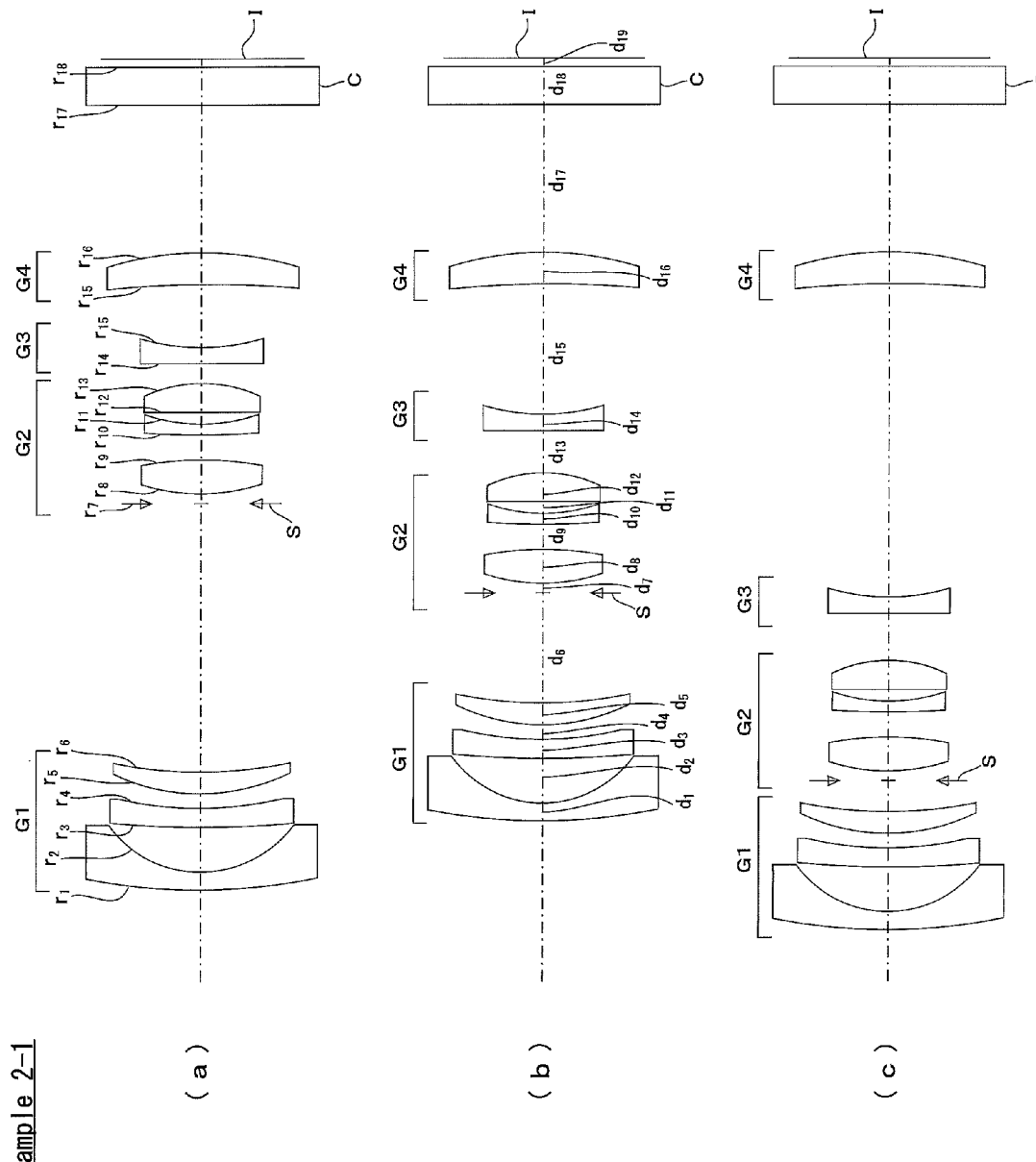
FIG. 10 is a sectional view of the zoom lens of Example 2-1 according to the second aspect of the invention, as taken apart along the optical axis.

FIG. 10 is a sectional view of the zoom lens of Example 2-1. As shown in FIG. 10, the zoom lens of Example 2-1 is built up of, in order from the object side to the image side, a first lens group G1 of negative refracting power, a second lens group G2 of positive refracting power, a third lens group G3 of negative refracting power and a fourth lens group G4 of positive refracting power. In FIG. 10, I and C are indicative of an image plane and a cover glass, respectively.

The first lens group G1 is made up of, in order from the object side to the image side, a negative meniscus lens convex on its object side, a negative meniscus lens that is convex on its object side and formed of a plastic material, and has aspheric surfaces on both sides, and a positive meniscus lens convex on its object side.

The second lens group G2 is made up of, in order from the object side to the image side, a stop S, a lens that is formed of a glass material and has aspheric surfaces on both sides, a negative lens and a positive lens.

The third lens group G3 is made up of a negative meniscus lens that is convex on its object side and formed of a plastic material, and has aspheric surfaces on both sides.

The fourth lens group G4 is made up of a positive meniscus lens convex on its image side.

Referring to the operation of the zoom lens of Examples 2-1, the first G1, the second G2 and the third lens group G3 move independently for zooming operation, and the fourth lens group G4 remains fixed in the position with respect to the image plane. The focusing operation, and the wobbling operation is implemented by the third lens group G3. Upon focusing from infinity to a near distance, the third lens group G3 moves to the image side.

Upon zooming from the wide-angle end to the telephoto end, the first lens group G1 moves to the image side just as it draws a convex orbit while the separation between it and the second lens group G2 becomes narrow.

Upon zooming from the wide-angle end to the telephoto end, the second lens group G2 moves while the separation between it and the third lens group G3 grows wide.

Upon zooming from the wide-angle end to the telephoto end, the third lens group G3 moves while the separation between it and the fourth lens group G4 grows wide.

EXAMPLE 2-2

Figure 11:
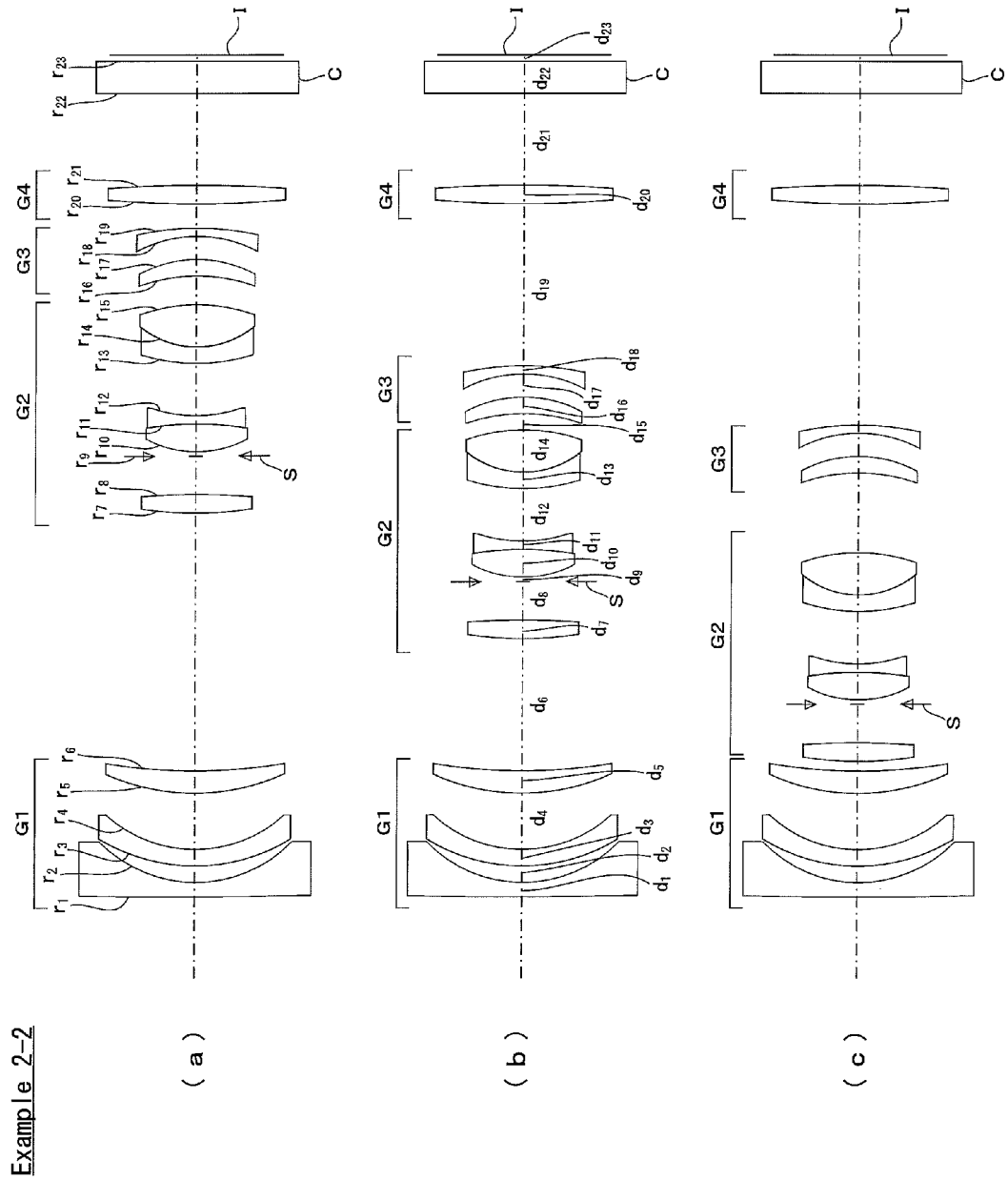
FIG. 11 is a sectional view of the zoom lens of Example 2-2 according to the second aspect of the invention, as taken apart along the optical axis.

FIG. 11 is a sectional view of the zoom lens of Example 2-2. As shown in FIG. 11, the zoom lens of Example 2-2 is built up of, in order from the object side to the image side, a first lens group G1 of negative refracting power, a second lens group G2 of positive refracting power, a third lens group G3 of negative refracting power and a fourth lens group G4 of positive refracting power. In FIG. 11, I and C are indicative of an image plane and a cover glass, respectively.

The first lens group G1 is made up of, in order from the object side to the image side, a negative lens, a negative meniscus lens that is convex on its object side and formed of a plastic material, and has aspheric surfaces on both sides, and a positive meniscus lens convex on its object side.

The second lens group G2 is made up of, in order from the object side to the image side, a positive lens, a stop S, a cemented negative lens of a positive lens and a negative lens, and a cemented positive lens of a negative lens and an aspheric positive lens formed of a glass material.

The third lens group G3 is made up of, in order from the object side to the image side, a positive meniscus lens convex on its image side and a negative meniscus lens convex on its image side.

The fourth lens group G4 is made up of a positive lens.

The operation of the zoom lens of Example 2-2 is now explained. For zooming operation, the second lens group G2 and the third lens group G3 move independently. The first lens group G1 and the fourth lens group G4 remain fixed in the position relative to the image plane. The focusing operation, and the wobbling operation is implemented by the third lens group G3. Upon focusing from infinity to a near distance, the third lens group G3 moves to the image side.

Upon zooming from the wide-angle end to the telephoto end, the second lens group G2 moves while the separation between it and the first lens group G1 becomes narrow.

Upon zooming from the wide-angle end to the telephoto end, the third lens group G3 moves such that once the separation between it and the second lens group G2 becomes narrow, it grows wide, and the separation between it and the fourth lens group G4 grows wide.

EXAMPLE 2-3

Figure 12:
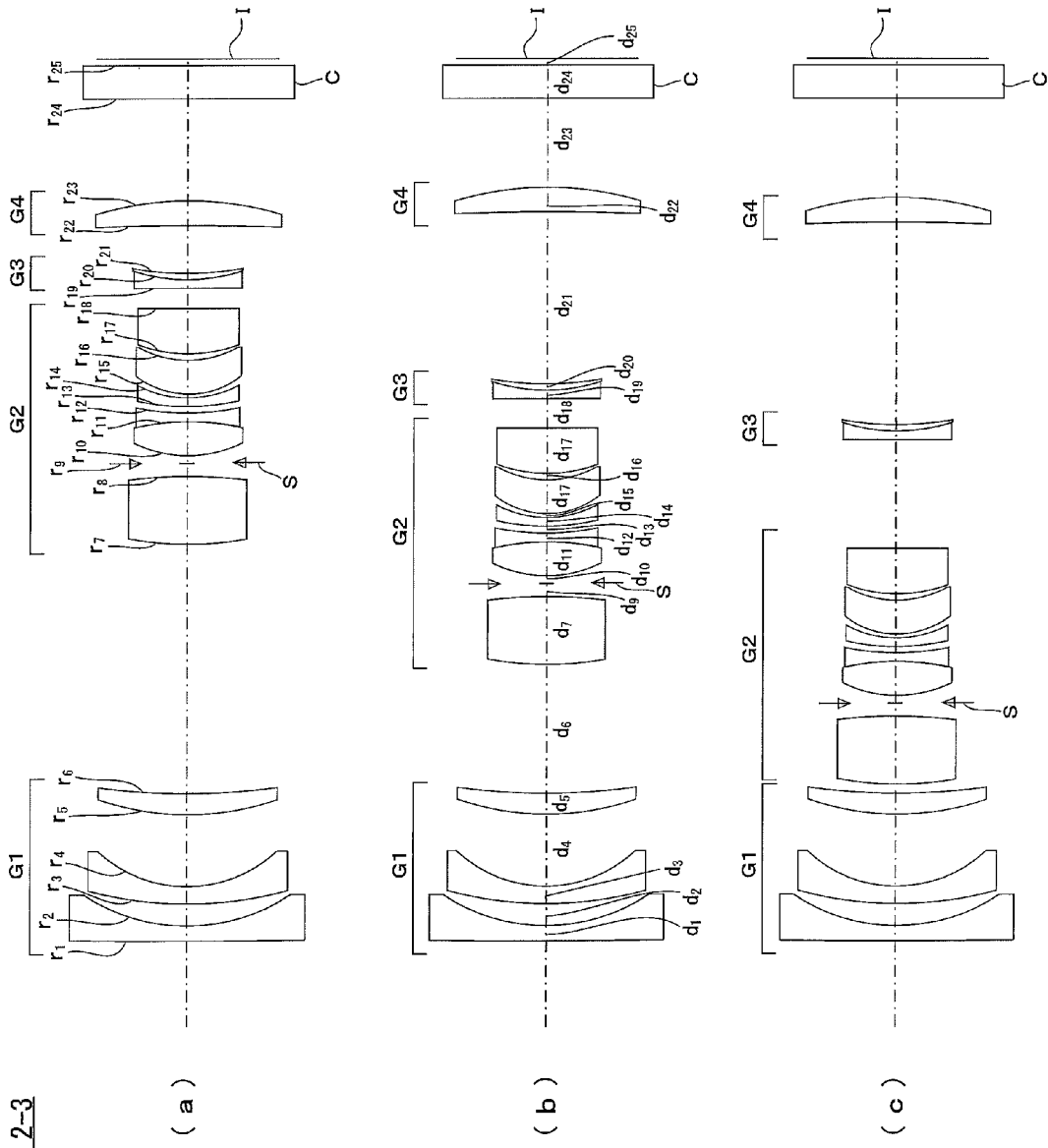
FIG. 12 is a sectional view of the zoom lens of Example 2-3 according to the second aspect of the invention, as taken apart along the optical axis.

FIG. 12 is a sectional view of the zoom lens of Example 2-3. As shown in FIG. 12, the zoom lens of Example 2-3 is built up of, in order from the object side to the image side, a first lens group G1 of negative refracting power, a second lens group G2 of positive refracting power, a third lens group G3 of negative refracting power and a fourth lens group G4 of positive refracting power. In FIG. 12, I and C are indicative of an image plane and a cover glass, respectively.

The first lens group G1 is made up of, in order from the object side to the image side, a negative meniscus lens convex on its object side, an aspheric negative meniscus lens that is convex on its object side and formed of a glass material, and a positive meniscus lens convex on its object side.

The second lens group G2 is made up of, in order from the object side to the image side, a negative meniscus lens convex on its object side, a stop S, a cemented negative lens of an aspheric positive lens formed of a glass material and a negative lens, a negative lens, a positive lens, and a lens formed of a glass material and having aspheric surfaces on both sides.

The third lens group G3 is made up of a cemented lens of a negative meniscus lens convex on its object side and an aspheric positive lens formed of a resinous material.

The fourth lens group G4 is made up of a positive meniscus lens convex on its image side.

How to operate the zoom lens of Example 2-3 is now explained. For zooming operation, the first G1, the second G2, the third G3 and the fourth lens group G4 move independently, but the amounts of movement of the first G1 and the fourth lens group G4 are slight. The focusing operation, and the wobbling operation is implemented by the third lens group G3. Upon focusing from infinity to a near distance, the third lens group G3 moves to the image side.

Upon zooming from the wide-angle end to the telephoto end, the first lens group G1 moves slightly to the image side.

Upon zooming from the wide-angle end to the telephoto and, the second lens group G2 moves such that the separation between it and the first lens group G1 becomes narrow.

Upon zooming from the wide-angle end to the telephoto end, the third lens group G3 moves such that the separation between it and the second lens group G2 grows wide and the separation between it and the fourth lens group G4 grows wide.

Upon zooming from the wide-angle end to the telephoto end, the fourth lens group G4 moves slightly to the image side just as it draws a convex orbit.

EXAMPLE 2-4

Figure 13:
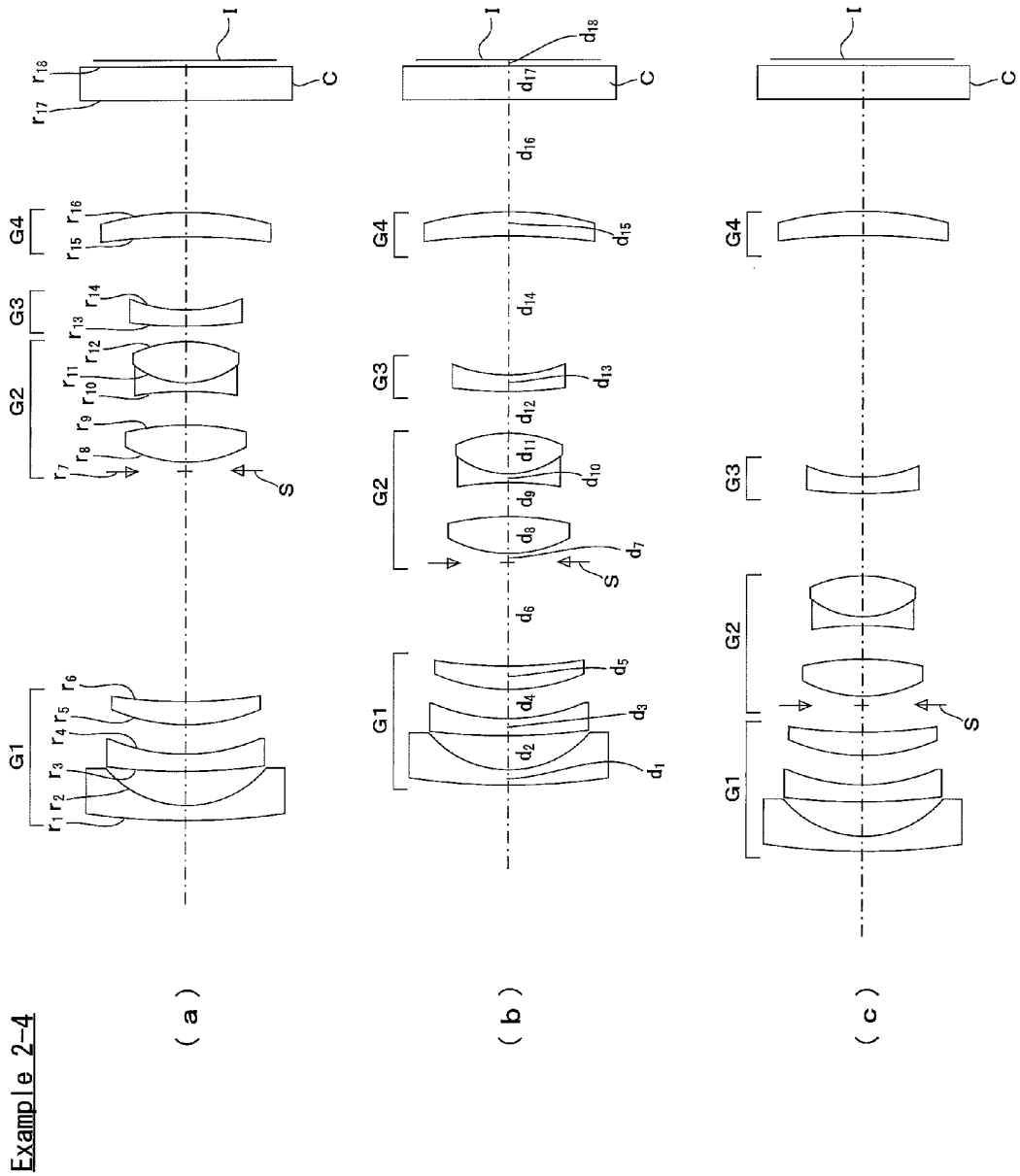
FIG. 13 is a sectional view of the zoom lens of Example 2-4 according to the second aspect of the invention, as taken apart along the optical axis.
Figure 14:
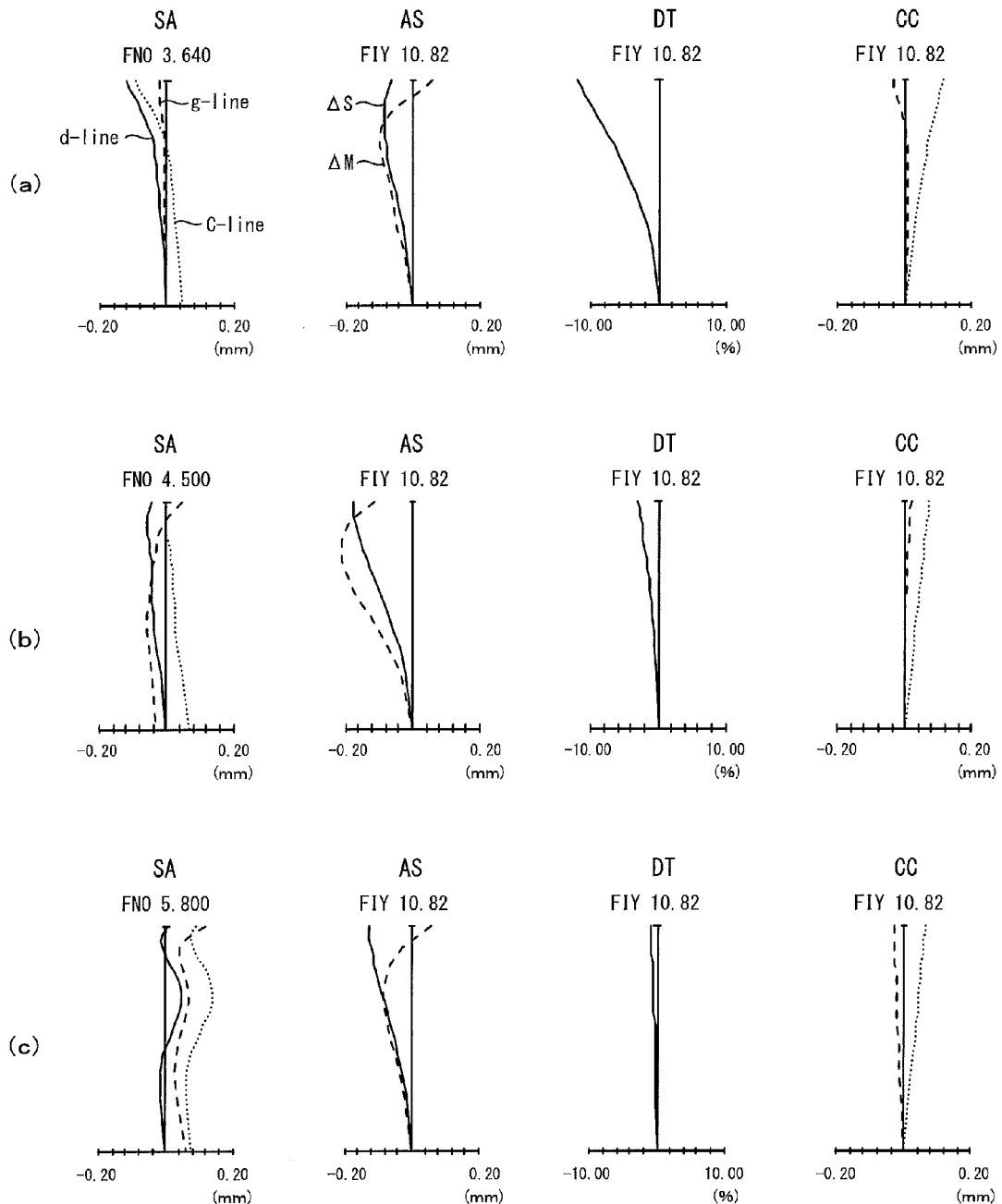
FIG. 14 is an aberration diagram for the zoom lens of Example 2-1 according to the second aspect of the invention.
Figure 15:
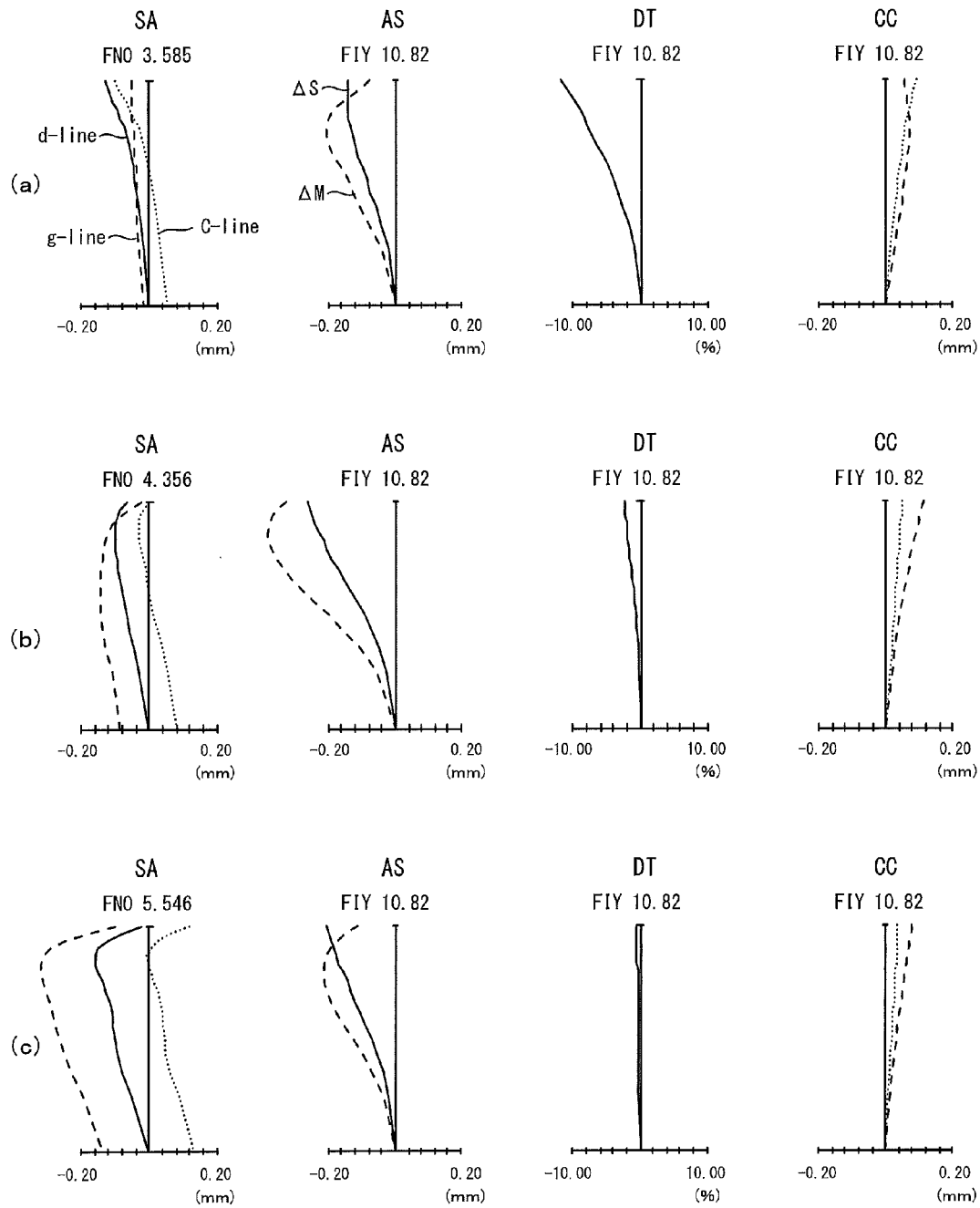
FIG. 15 is an aberration diagram for the zoom lens of Example 2-1 according to the second aspect of the invention.
Figure 16:
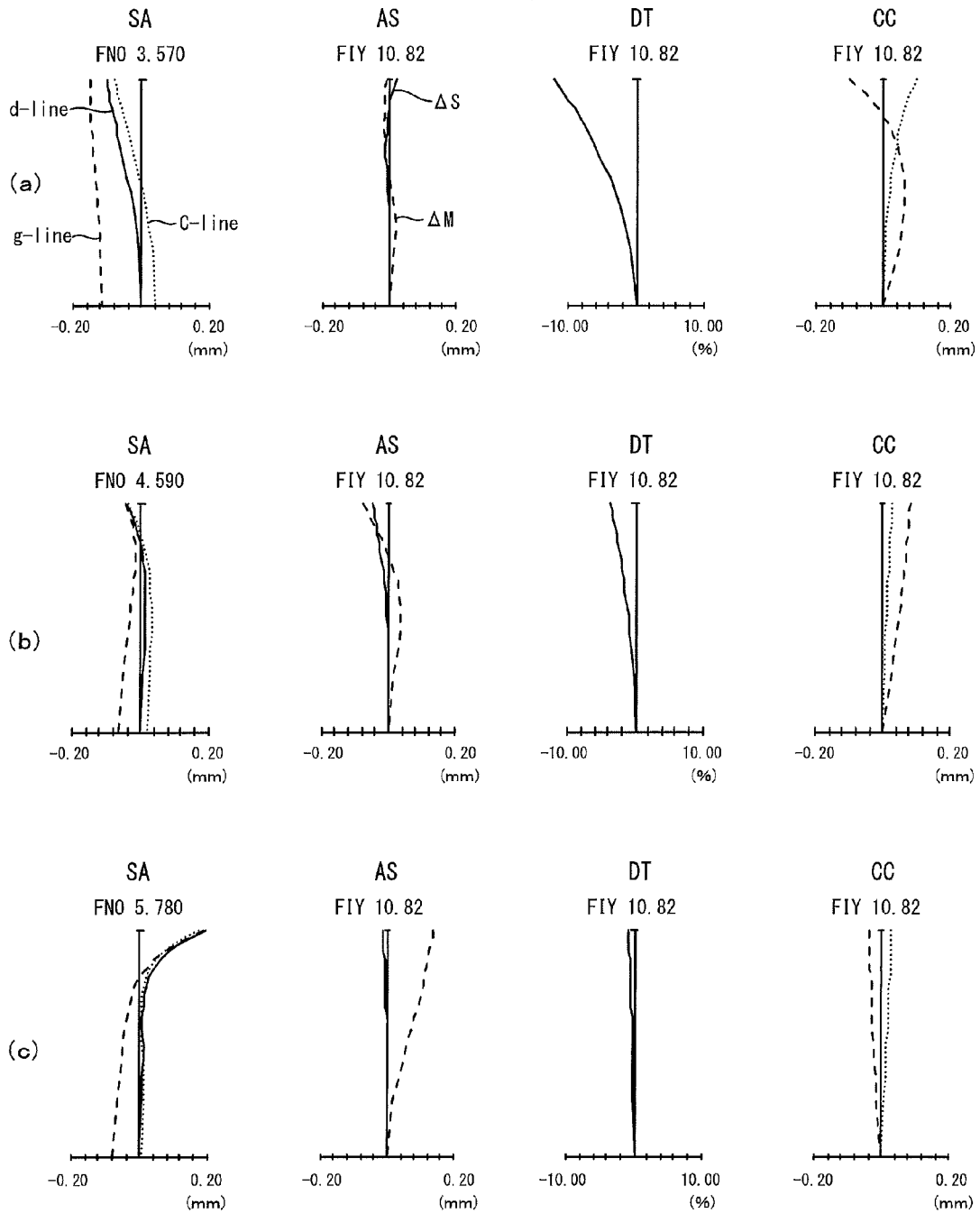
FIG. 16 is an aberration diagram for the zoom lens of Example 2-2 according to the second aspect of the invention.
Figure 17:
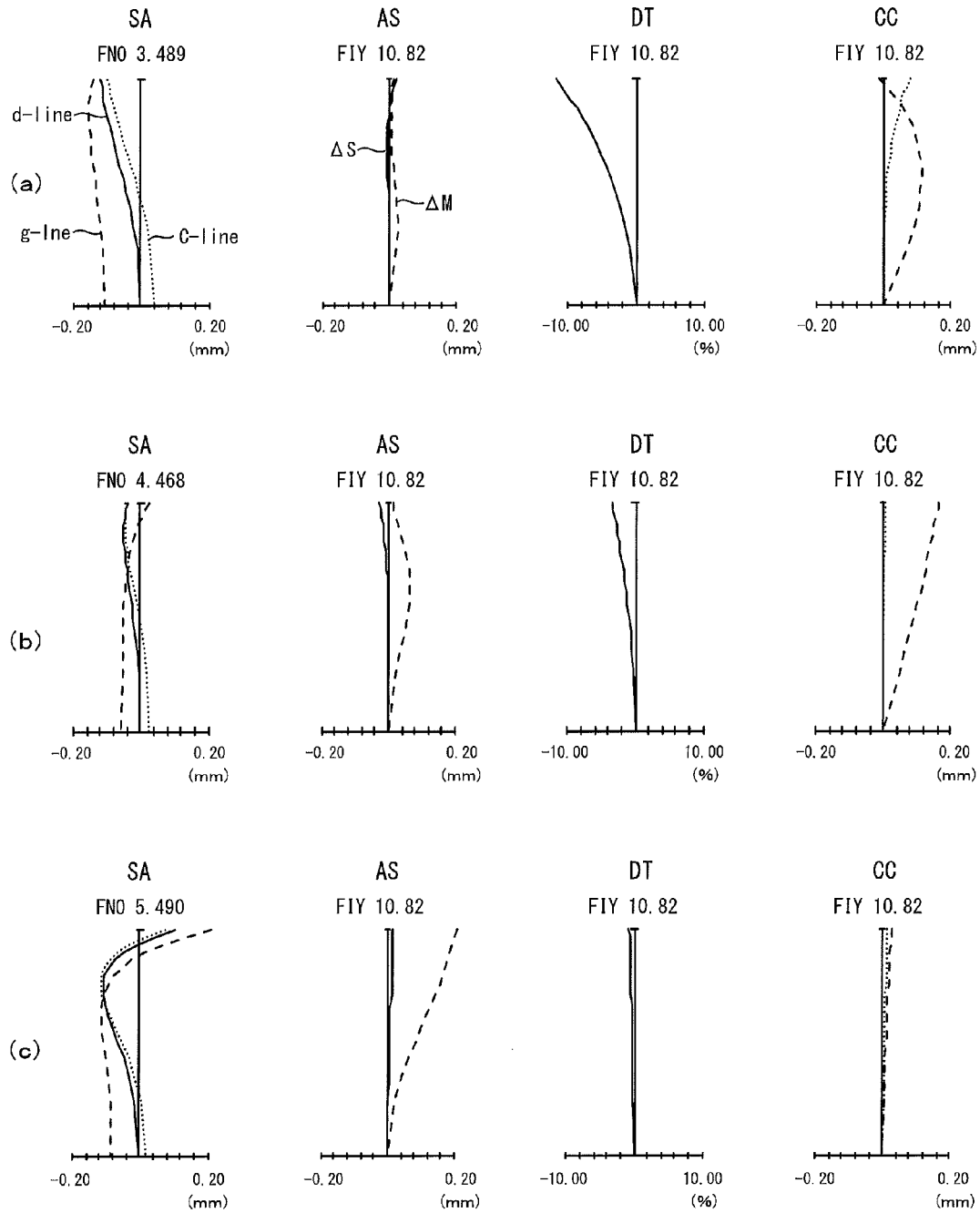
FIG. 17 is an aberration diagram for the zoom lens of Example 2-2 according to the second aspect of the invention.
Figure 18:
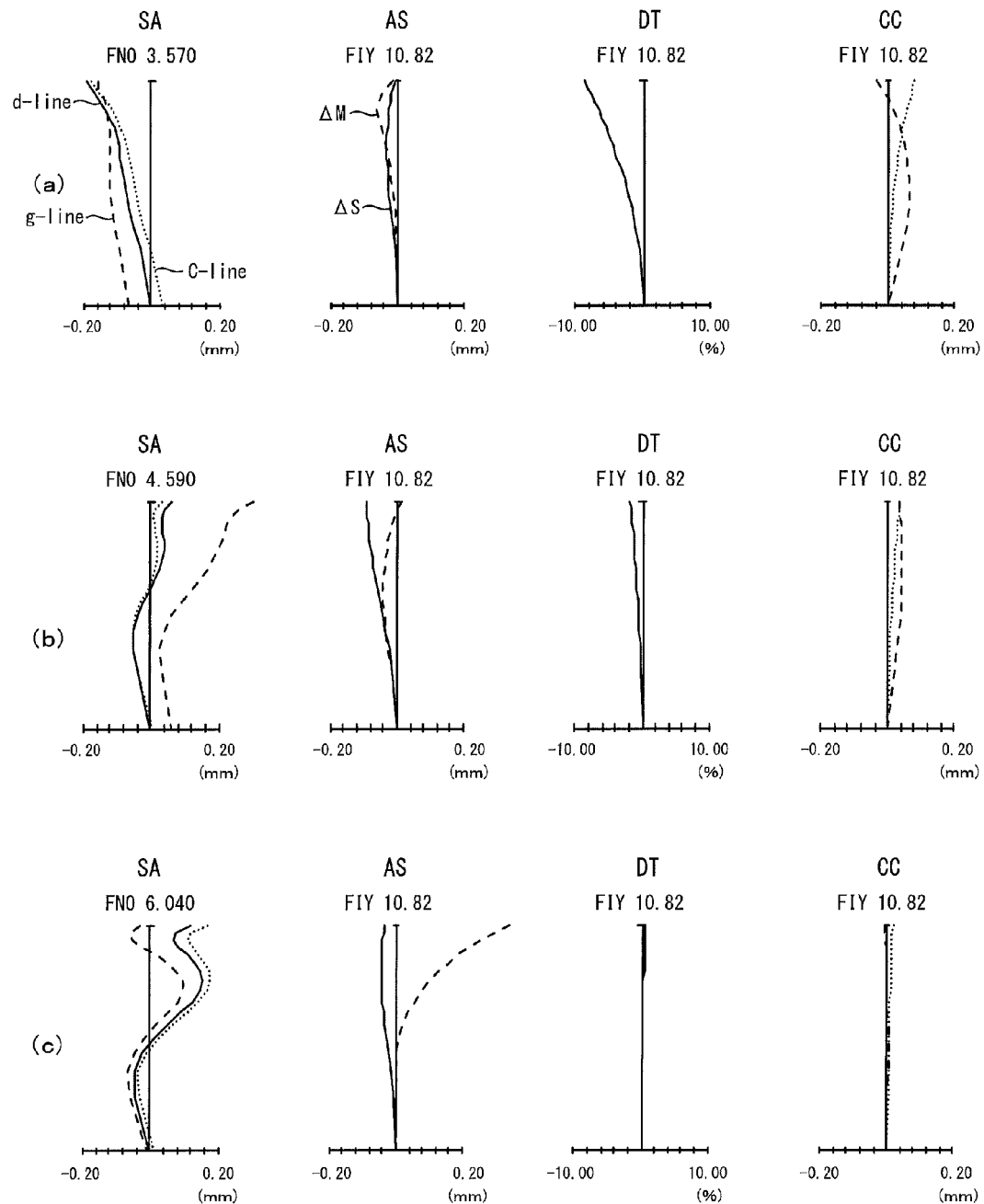
FIG. 18 is an aberration diagram for the zoom lens of Example 2-3 according to the second aspect of the invention.
Figure 19:
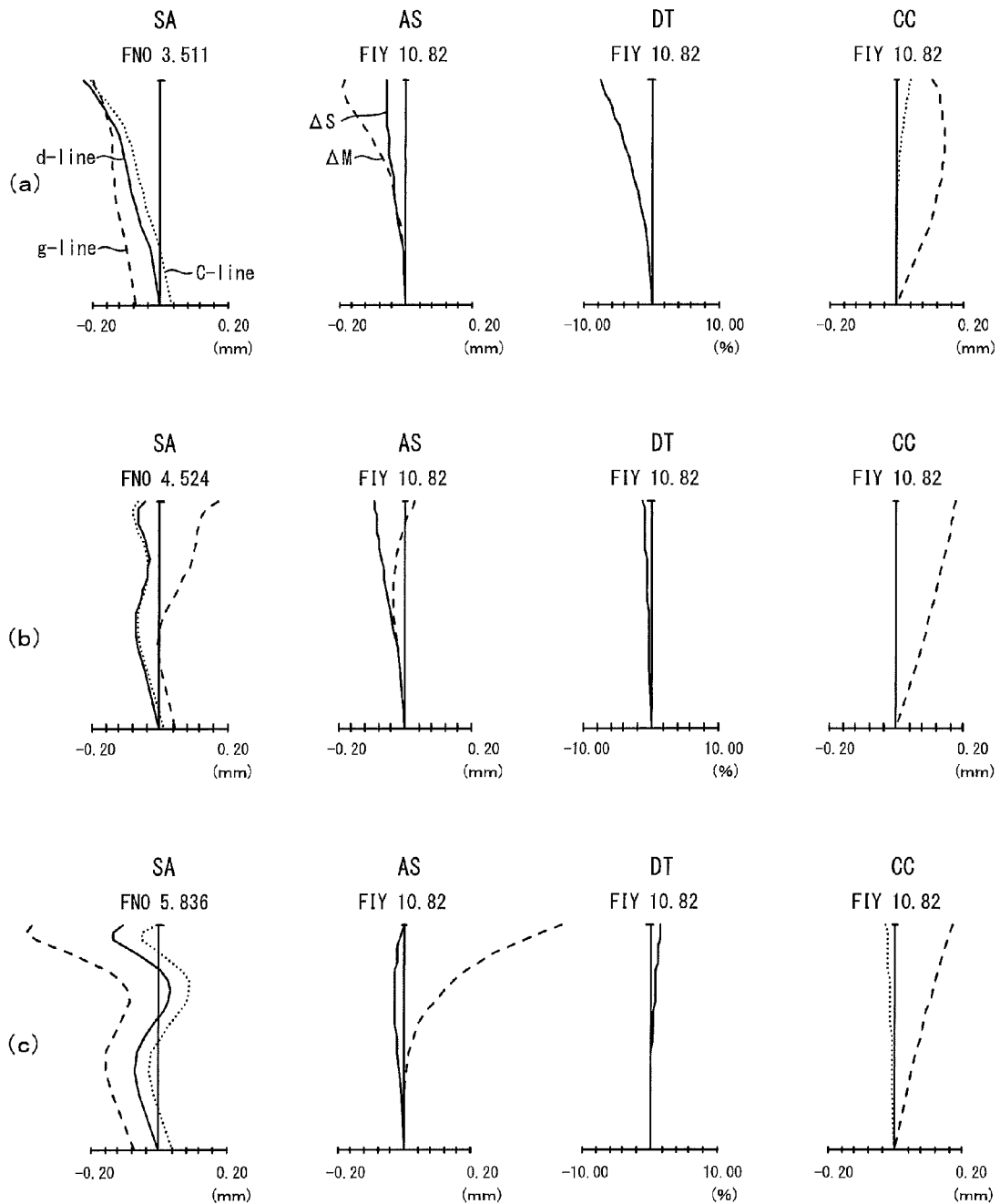
FIG. 19 is an aberration diagram for the zoom lens of Example 2-3 according to the second aspect of the invention.
Figure 20:
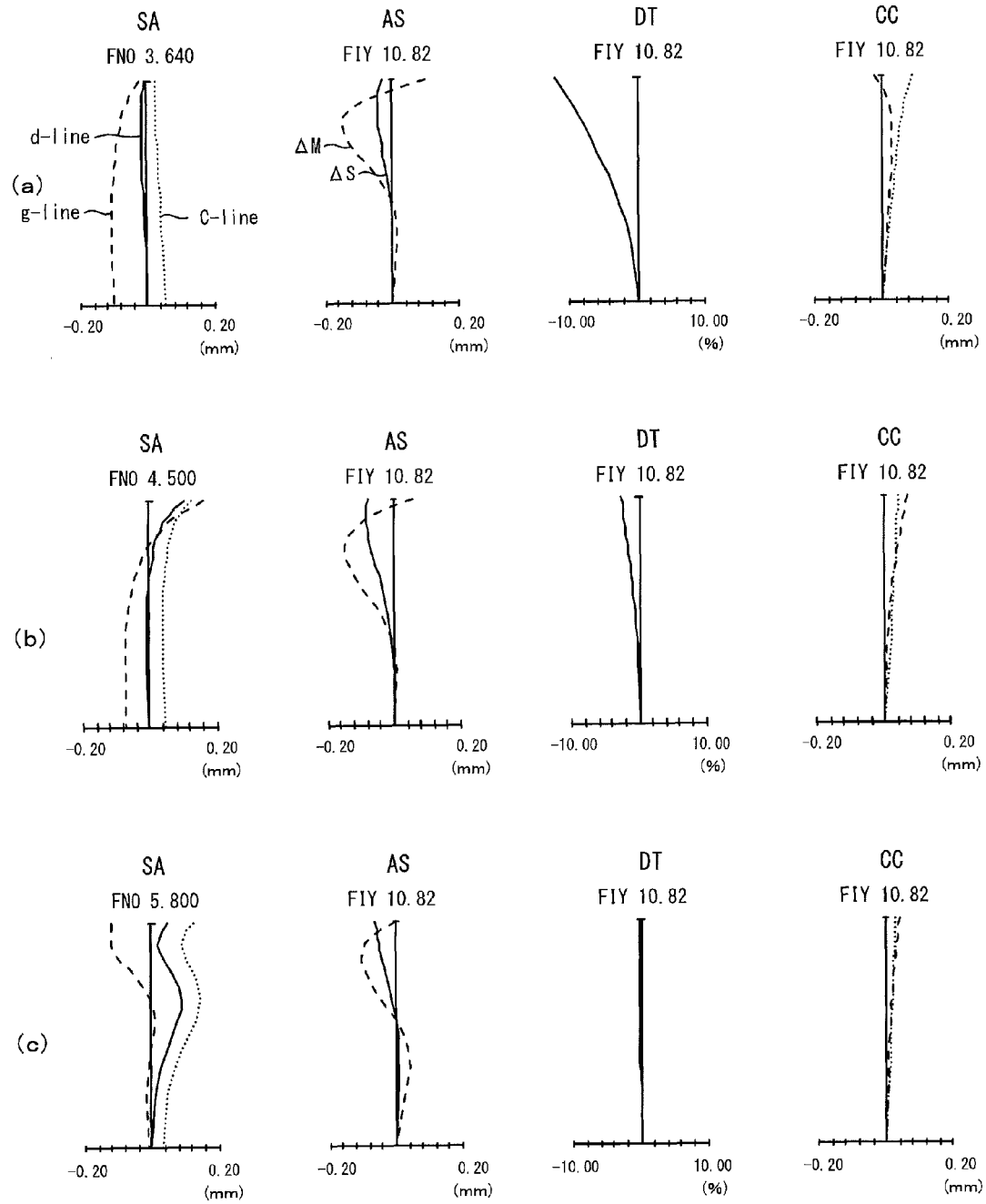
FIG. 20 is an aberration diagram for the zoom lens of Example 2-4 according to the second aspect of the invention.
Figure 21:
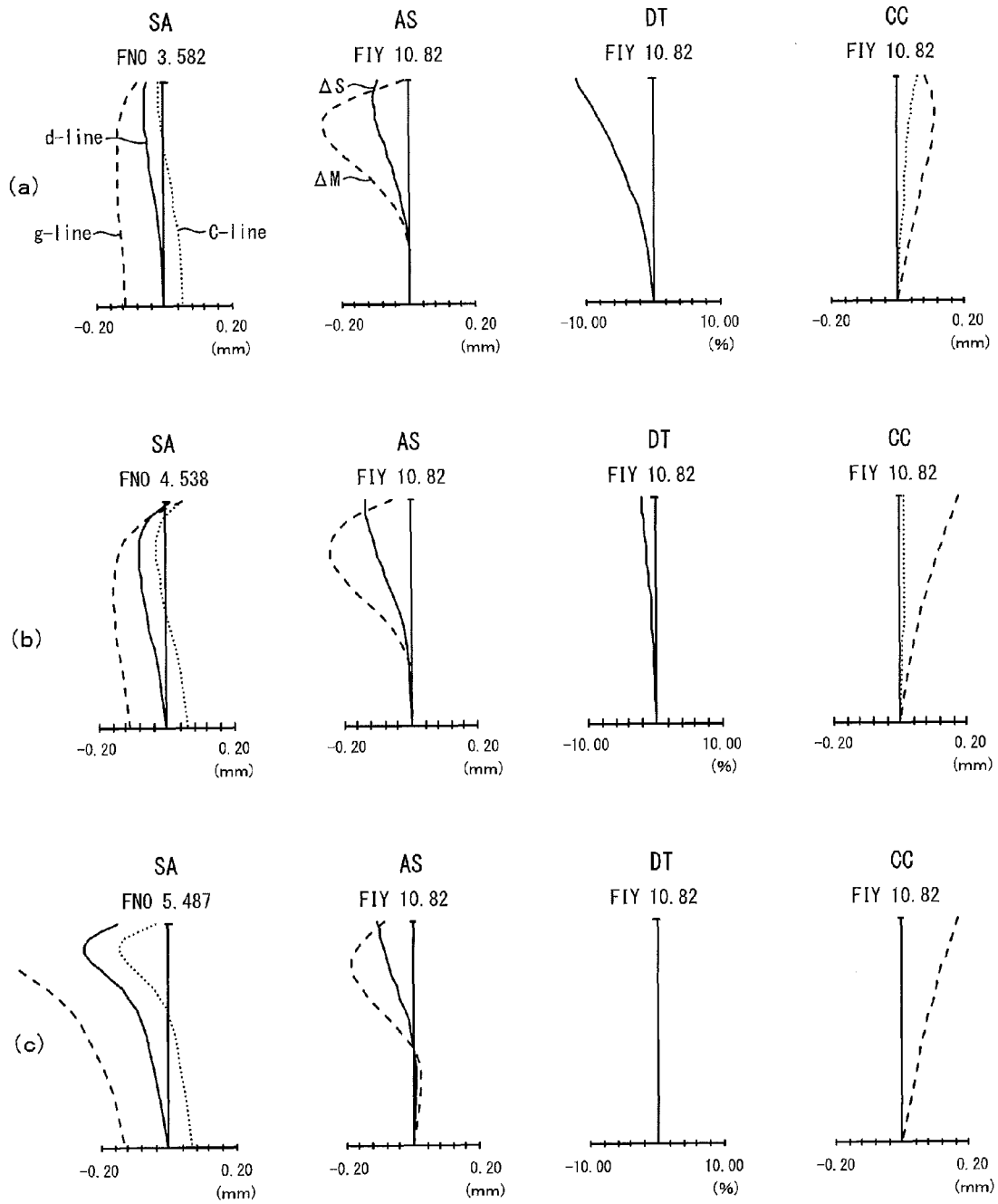
FIG. 21 is an aberration diagram for the zoom lens of Example 2-4 according to the second aspect of the invention.

FIG. 13 is a sectional view of the zoom lens of Example 2-4. As shown in FIG. 13, the zoom lens of Example 2-4 is built up of, in order from the object side to the image side, a first lens group G1 of negative refracting power, a second lens group G2 of positive refracting power, a third lens group G3 of negative refracting power and a fourth lens group G4 of positive refracting power. In FIG. 13, I and C are indicative of an image plane and a cover glass, respectively.

The first lens group G1 is made up of, in order from the object side to the image side, a negative meniscus lens convex on its object side, a negative meniscus lens that is convex on its object side and formed of a plastic material, and has aspheric surfaces on both sides, and a positive meniscus lens convex on its object side.

The second lens group G2 is made up of, in order from the object side to the image side, a stop S, an aspheric lens formed of a glass material and having aspheric surfaces on both sides, and a cemented negative lens of a negative lens and a positive lens.

The third lens group G3 is made up of a negative meniscus lens that is convex on its object side and formed of a plastic material, and has aspheric surfaces on both sides.

The fourth lens group G4 is made up of a positive meniscus lens convex on its image side.

How to operate the zoom lens of Example 2-4 is now explained. For zooming operation, the first G1, the second G2 and the third lens group G3 move independently. The fourth lens group G4 remains fixed in the position relative to the image plane. The focusing operation, and the wobbling operation is implemented by the third lens group G3. Upon focusing from the infinity to a near distance, the third lens group G3 moves to the image side.

Upon focusing from the wide-angle end to the telephoto end, the first lens group G1 moves to the image side in a convex orbit while the separation between it and the second lens group G2 becomes narrow.

Upon focusing from the wide-angle end to the telephoto end, the second lens group G2 moves such that the separation between it and the third lens group G3 grows wide.

Upon focusing from the wide-angle end to the telephoto end, the third lens group G3 moves such that the separation between it and the fourth lens group G4 grows wide.

NUMERAL EXAMPLES

Set out below are data sets of Examples 2-1 and 2-4 such as surface data, variable separation data, data set 1 and data set 2.

The surface data include the radius of curvature r of the lens surface for each surface No., the surface separation d, the d (587.6 nm)-line refractive index nd of each lens (optical medium), and the d-line Abbe constant vd of each lens (optical medium). The radius of curvature r and surface separation d are given in mm. In the surface data, the asterisk * affixed to the right side of the surface No. indicates that the lens surface is of aspheric shape, and ∞ in the radius of curvature column is indicative of infinity.

Referring to aspheric data, data about the aspheric lens surfaces are given in the surface data. Suppose here that x is an optical axis provided that the direction of travel of light is taken as positive, and y is a direction orthogonal to the optical axis. Then the aspheric shape is represented by:

$$x=(y^2/r)/\{1+\{1-(1+K)\cdot(y/r)^2\}^{1/2}\}+A4y^4+A6y^6+A8y^8+A10y^{10}$$

where r is the paraxial radius of curvature, K is the conic coefficient, and A4, A6, A8 and A10 are the $4^{th}$-, $6^{th}$-, $8^{th}$- and $10^{th}$-order aspheric coefficients. It is here noted that the capital E indicates that the following numerical value is a power exponent with 10 as base; for instance, 1.0E-5 means 1.0× $10^{-5}$.

Data set 1 includes various zoom data at the wide-angle end (WE), in the intermediate setting (ST) and at the telephoto end (TE). The zoom data include focal lengths, F-numbers (Fno), angles of vies (2ω), image heights, back focuses (BF), and variable surface separations d, and data set 2 includes focal lengths f1 to f4 of the first to fourth lens groups.

Numeral Example 2-1

| Surface No. | r | d | nd | vd |
|---|---|---|---|---|
| 1 | 66.221 | 1.800 | 1.77250 | 49.60 |
| 2 | 12.156 | 4.833 | | |
| 3* | 596.814 | 2.000 | 1.52542 | 55.78 |
| 4* | 38.298 | 1.660 | | |
| 5 | 22.269 | 2.240 | 1.84666 | 23.78 |
| 6 | 44.102 | d6 (Variable) | | |
| 7 (Stop) | ∞ | 1.000 | | |
| 8* | 17.075 | 3.623 | 1.58313 | 59.46 |
| 9* | −36.072 | 2.690 | | |
| 10 | 69.903 | 1.194 | 1.80518 | 25.42 |
| 11 | 18.154 | 1.204 | | |
| 12 | ∞ | 3.197 | 1.49700 | 81.54 |
| 13 | −13.700 | d13 (Variable) | | |
| 14* | −2946.455 | 1.779 | 1.52542 | 55.78 |
| 15* | 25.052 | d15 (Variable) | | |
| 16 | −115.378 | 3.320 | 1.48749 | 70.23 |
| 17 | −35.511 | 15.907 | | |
| 18 | ∞ | 4.000 | 1.51633 | 64.14 |
| 19 | ∞ | 0.800 | | |
| Image Plane | ∞ | | | |

Aspheric Data

3rd Surface

K = −351.3695
A4 = 5.6281E−5
A6 = −1.5969E−7
A8 = 1.6724E−9
A10 = −1.7698E−11

4th Surface

K = 6.5165
A4 = 1.3930E−5
A6 = −2.5816E−7
A8 = 2.5151E−11
A10 = −2.2224E−11

8th Surface

K = 0
A4 = −5.3759E−5
A6 = −6.4826E−7
A8 = 1.4027E−8
A10 = −4.0383E−10

9th Surface

K = 0
A4 = 4.2907E−5
A6 = −5.0492E−7
A8 = 7.7123E−9
A10 = −3.2023E−10

14th Surface

K = 539.3619
A4 = 9.0888E−6
A6 = −1.3901E−7
A8 = 4.0463E−8
A10 = −5.3585E−10

15th Surface

K = −6.9070
A4 = 7.6097E−5
A6 = −2.7093E−7
A8 = 3.8636E−8
A10 = −5.2598E−10

| | WE | ST | TE |
|---|---|---|---|
| Data Set 1 | | | |
| Focal length | 14.285 | 24.237 | 41.090 |
| Fno | 3.64 | 4.50 | 5.80 |
| 2ω (°) | 81.68 | 49.42 | 29.78 |
| Image Height | 10.82 | 10.82 | 10.82 |
| BF | 19.379 | 19.390 | 19.305 |
| d6 | 28.665 | 11.680 | 3.233 |
| d13 | 2.000 | 4.542 | 5.021 |
| d15 | 6.796 | 13.962 | 33.612 |
| Data Set 2 | | | |
| f1 | −24.03 | | |
| f2 | 20.38 | | |
| f3 | −47.27 | | |
| f4 | 103.82 | | |

Numeral Example 2-2

| Surface No. | r | d | nd | vd |
|---|---|---|---|---|
| 1 | 1152.787 | 1.800 | 1.77250 | 49.60 |
| 2 | 16.501 | 2.116 | | |
| 3* | 32.509 | 2.000 | 1.52542 | 55.78 |
| 4* | 15.856 | 6.883 | | |
| 5 | 28.166 | 2.730 | 1.84666 | 23.78 |
| 6 | 62.914 | d6 (Variable) | | |
| 7 | 40.635 | 2.310 | 1.88300 | 40.76 |
| 8 | −125.587 | 4.748 | | |
| 9 (Stop) | ∞ | 0.530 | | |
| 10 | 13.681 | 3.395 | 1.49700 | 81.54 |
| 11 | −49.367 | 1.035 | 1.91082 | 35.25 |
| 12 | 19.152 | 6.447 | | |
| 13 | 24.970 | 2.013 | 1.58267 | 46.42 |
| 14 | 11.093 | 5.178 | 1.49700 | 81.54 |
| 15* | −24.504 | d15 (Variable) | | |
| 16 | −19.566 | 2.012 | 1.80810 | 22.76 |
| 17 | −14.844 | 2.843 | | |
| 18 | −14.665 | 1.000 | 1.83400 | 37.16 |
| 19 | −42.193 | d19 (Variable) | | |
| 20 | 119.278 | 2.297 | 1.78590 | 44.20 |
| 21 | −141.669 | 11.300 | | |
| 22 | ∞ | 4.000 | 1.51633 | 64.14 |
| 23 | ∞ | 0.800 | | |
| Image Plane | ∞ | | | |

Aspheric Data

3rd Surface

K = 0
A4 = 5.9559E−5
A6 = −1.3717E−7
A8 = 4.9357E−10
A10 = 0

4th Surface

K = −2.7825
A4 = 1.0523E−4
A6 = −4.1784E−7
A8 = 1.2064E−9
A10 = −2.9471E−12

15th Surface

K = −0.7648
A4 = 2.9298E−5
A6 = −4.1055E−8
A8 = 2.0913E−9
A10 = −1.4188E−11

| | WE | ST | TE |
|---|---|---|---|
| Data Set 1 | | | |
| Focal length | 14.280 | 24.220 | 41.159 |
| Fno | 3.57 | 4.59 | 5.78 |
| 2ω (°) | 81.62 | 49.79 | 29.72 |
| Image Height | 10.82 | 10.82 | 10.82 |
| BF | 14.739 | 14.739 | 14.742 |
| d6 | 31.652 | 16.183 | 1.060 |
| d15 | 3.576 | 2.148 | 9.910 |
| d19 | 3.080 | 19.978 | 27.330 |

-continued

|  | Data Set 2 |
|---|---|
| f1 | −25.02 |
| f2 | 26.72 |
| f3 | −47.45 |
| f4 | 82.72 |

Numeral Example 2-3

| Surface No. | r | d | nd | vd |
|---|---|---|---|---|
| 1 | 309.077 | 1.850 | 1.77250 | 49.60 |
| 2 | 21.837 | 2.584 | | |
| 3 | 42.350 | 2.000 | 1.58313 | 59.38 |
| 4* | 13.369 | 8.468 | | |
| 5 | 30.605 | 2.500 | 1.84666 | 23.78 |
| 6 | 68.190 | d6 (Variable) | | |
| 7 | 42.054 | 7.830 | 1.88300 | 40.76 |
| 8 | −102.912 | 1.600 | | |
| 9 (Stop) | ∞ | 0.900 | | |
| 10* | 15.080 | 4.000 | 1.49700 | 81.54 |
| 11 | −31.434 | 1.000 | 1.91082 | 35.25 |
| 12 | 29.998 | 0.776 | | |
| 13 | 28.025 | 1.000 | 1.59270 | 35.31 |
| 14 | 12.350 | 0.422 | | |
| 15 | 9.844 | 4.000 | 1.51742 | 52.43 |
| 16 | 12.489 | 0.719 | | |
| 17* | 15.003 | 5.404 | 1.49700 | 81.54 |
| 18* | −87.323 | d18 (Variable) | | |
| 19 | 210.946 | 1.000 | 1.83400 | 37.16 |
| 20 | 19.812 | 0.800 | 1.63387 | 23.38 |
| 21* | 36.318 | d21 (Variable) | | |
| 22 | −303.237 | 2.898 | 1.78590 | 44.20 |
| 23 | −37.288 | d23 (Variable) | | |
| 24 | ∞ | 4.000 | 1.51633 | 64.14 |
| 25 | ∞ | 0.800 | | |
| Image Plane | ∞ | | | |

Aspheric Data $4^{th}$ Surface

K = −0.3907
A4 = −2.8020E−5
A6 = −7.7372E−8
A8 = −1.2952E−10
A10 = −1.7021E−13

$10^{th}$ Surface

K = −0.2056
A4 = 3.6941E−5
A6 = −1.6821E−07
A8 = 1.5142E−8
A10 = −1.0878E−10

$17^{th}$ Surface

K = −2.5969
A4 = 3.5444E−5
A6 = −7.3076E−07
A8 = −3.4696E−8
A10 = 5.5980E−11

$18^{th}$ Surface

K = 9.5853
A4 = 1.0126E−4
A6 = 6.3780E−07
A8 = −3.3217E−8
A10 = 5.4691E−10

$21^{th}$ Surface

K = 0
A4 = 1.5275E−5
A6 = 0
A8 = 0
A10 = 0

-continued

|  | WE | ST | TE |
|---|---|---|---|
|  | Data Set 1 | | |
| Focal length | 14.296 | 24.207 | 41.145 |
| Fno | 3.57 | 4.59 | 6.04 |
| 2ω (°) | 79.34 | 48.97 | 29.28 |
| Image Height | 10.82 | 10.82 | 10.82 |
| BF | 15.330 | 13.825 | 15.021 |
| d6 | 29.347 | 15.018 | 1.000 |
| d18 | 2.335 | 3.480 | 12.690 |
| d21 | 5.628 | 20.215 | 23.830 |
| d23 | 11.891 | 10.388 | 11.580 |
|  | Data Set 2 | | |
| f1 | −24.37 | | |
| f2 | 24.56 | | |
| f3 | −42.38 | | |
| f4 | 53.84 | | |

Numeral Example 2-4

| Surface No. | r | d | nd | vd |
|---|---|---|---|---|
| 1 | 65.978 | 1.800 | 1.78800 | 47.37 |
| 2 | 12.450 | 3.981 | | |
| 3* | 90.000 | 2.000 | 1.52542 | 55.78 |
| 4* | 20.180 | 3.524 | | |
| 5 | 22.924 | 2.607 | 1.84666 | 23.78 |
| 6 | 49.658 | d6 (Variable) | | |
| 7 (Stop) | ∞ | 1.000 | | |
| 8* | 13.846 | 4.339 | 1.58313 | 59.46 |
| 9* | −30.911 | 3.937 | | |
| 10 | −49.029 | 1.000 | 1.80440 | 39.59 |
| 11 | 9.821 | 4.813 | 1.49700 | 81.54 |
| 12 | −14.605 | d12 (Variable) | | |
| 13* | 31.473 | 1.991 | 1.52542 | 55.78 |
| 14* | 14.165 | d14 (Variable) | | |
| 15 | −74.640 | 2.800 | 1.80100 | 34.97 |
| 16 | −37.283 | 12.993 | | |
| 17 | ∞ | 4.000 | 1.51633 | 64.14 |
| 18 | ∞ | 0.800 | | |
| Image Surface | ∞ | | | |

Aspheric Data $3^{rd}$ Surface

K = 71.0698
A4 = 2.8898E−6
A6 = −2.8831E−7
A8 = 3.5469E−9
A10 = −2.3921E−11

$4^{th}$ Surface

K = 1.8680
A4 = −4.2096E−5
A6 = −5.0518E−7
A8 = 2.7008E−9
A10 = −2.7653E−11

$8^{th}$ Surface

K = 0
A4 = −3.2410E−5
A6 = 1.8766E−8
A8 = 1.6634E−9
A10 = −1.0526E−10

$9^{th}$ Surface

K = 0
A4 = 5.4652E−5
A6 = 1.5262E−7
A8 = −3.7265E−9
A10 = −6.1662E−11

-continued

13th Surface

K = −53.7530
A4 = 2.1154E−5
A6 = −4.6684E−6
A8 = 1.5965E−7
A10 = −1.5934E−9

14th Surface

K = −0.9154
A4 = −1.8555E−4
A6 = −2.2370E−7
A8 = 9.0088E−8
A10 = −1.1775E−9

|  | WE | ST | TE |
|---|---|---|---|
| Data Set 1 | | | |
| Focal length | 14.280 | 24.241 | 41.160 |
| Fno | 3.64 | 4.50 | 5.80 |
| 2ω (°) | 81.64 | 49.24 | 29.53 |
| Image Height | 10.82 | 10.82 | 10.82 |
| BF | 16.431 | 16.431 | 16.428 |
| d6 | 26.874 | 12.040 | 3.100 |
| d12 | 1.700 | 4.817 | 9.576 |
| d14 | 8.587 | 16.249 | 28.185 |
| Data Set 2 | | | |
| f1 | −21.52 | | |
| f2 | 21.42 | | |
| f3 | −51.04 | | |
| f4 | 90.00 | | |

FIGS. 14, 16, 18 and 20 are aberration diagrams for Examples 2-1 to 2-4 on an infinite object point (a) at the wide-angle end (WE), (b) in the intermediate setting (ST), and (c) at the telephoto end (TE), respectively, and FIGS. 15, 17, 19 and 21 are aberration diagrams for Examples 2-1 to 2-4 in an object distance of 0.9 m (a) at the wide-angle end (WE), (b) in the intermediate setting (ST), and (c) at the telephoto end (TE), respectively.

In those aberration diagrams, SA, AS, DT and CC stand for spherical aberrations, astigmatism, distortion and chromatic aberration of magnification, respectively. Given are spherical aberrations SA at the respective wavelengths of 587.6 mm (d-line: a solid line), 435.8 nm (g-line: a broken line) and 656.3 nm (C-line: a dotted line), and chromatic aberration of magnification CC at the respective wavelengths of 435.8 nm (g-line: a broken line) and 656.3 nm (C-line: a dotted line) on a d-line basis. Astigmatisms DT are given with the meridional image plane as a solid line and the sagittal image plane as a broken line. Note here that FNO and FIY are indicative of an F-number and the maximum image height, respectively.

Tabulated below are the values of Conditions (1) to (15) in Examples 2-1 and 2-4.

|  | Example 2-1 | Examples 2-2 | Examples 2-3 | Examples 2-4 |
|---|---|---|---|---|
| Condition (1) | 0.66 | 0.18 | 0.81 | 0.58 |
| Condition (2) | 0.54 | 0.19 | 0.63 | 0.45 |
| Condition (14) | 1.36 | 1.03 | 1.07 | 1.15 |
| Condition (5)' | −1.68 | −1.75 | −1.70 | −1.51 |
| Condition (6)' | 1.43 | 1.87 | 1.72 | 1.50 |
| Condition (7)' | −3.31 | −3.32 | −2.96 | −3.57 |
| Condition (8)' | 7.27 | 5.79 | 3.77 | 6.30 |
| Condition (15) | 0.23 | 0.36 | 0.09 | 0.28 |
| Condition (11) | 10.82 | 10.82 | 10.82 | 10.82 |
| Condition (12)' | 2.88 | 2.88 | 2.88 | 2.88 |
| Condition (13)' | 40.84 | 40.81 | 39.67 | 40.82 |

Figure 22:
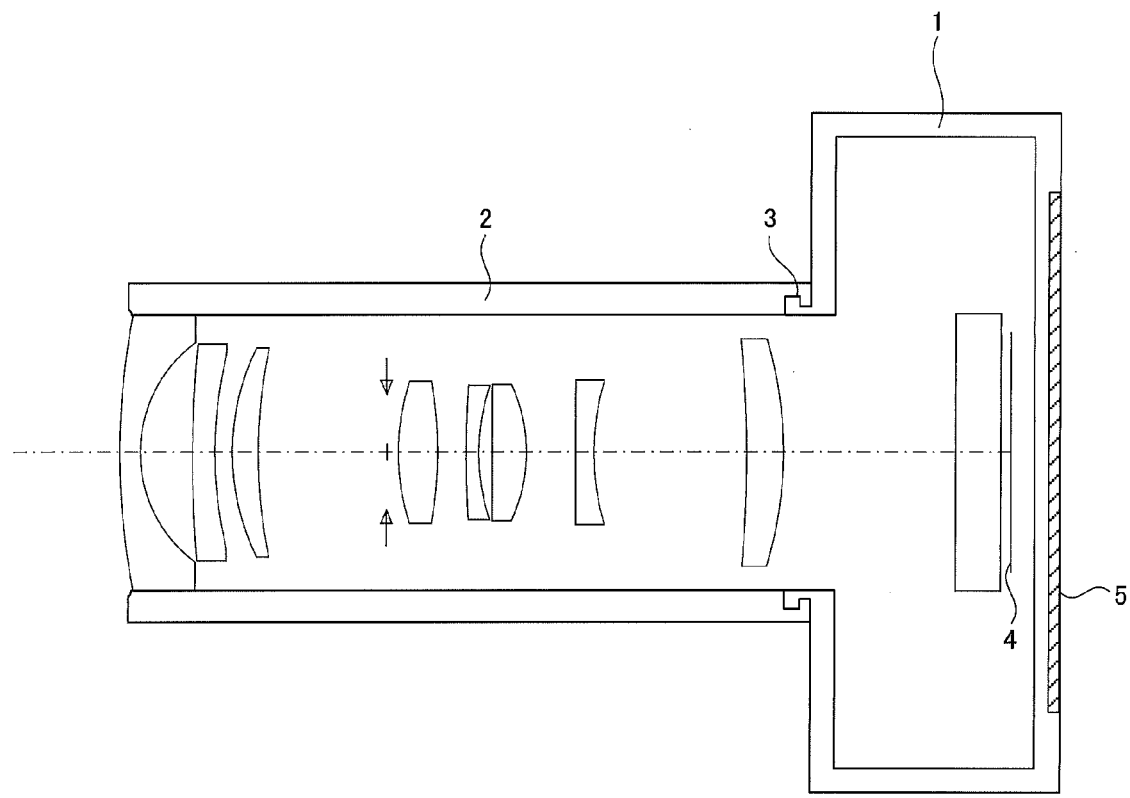
FIG. 22 is a sectional view of an imaging apparatus using the zoom lens according to the second aspect of the invention as an interchangeable lens.

FIG. 22 is a sectional view of a single-lens mirrorless camera that is one example of the imaging apparatus that uses the zoom lens according to the second aspect of the invention and incorporates a small-format CCD, CMOS or the like as an imaging device. In FIG. 22, reference numeral 1 is a single-lens mirrorless camera; 2 is an imaging lens system located within a lens barrel; and 3 is a lens barrel mount for making the imaging lens system 2 attachable to or detachable from the single-lens mirrorless camera 1. For that lens mount, for instance, a screw or bayonet type mount may be used. The bayonet type mount is here used. Reference numerals 4 and 5 are an imaging device plane and a back monitor, respectively.

As the imaging lens system 2 in the thus assembled single-lens mirrorless camera 1, for instance, the zoom lenses of Examples 2-1 to 2-4 according to the second aspect of the invention may be used.

Figure 23:
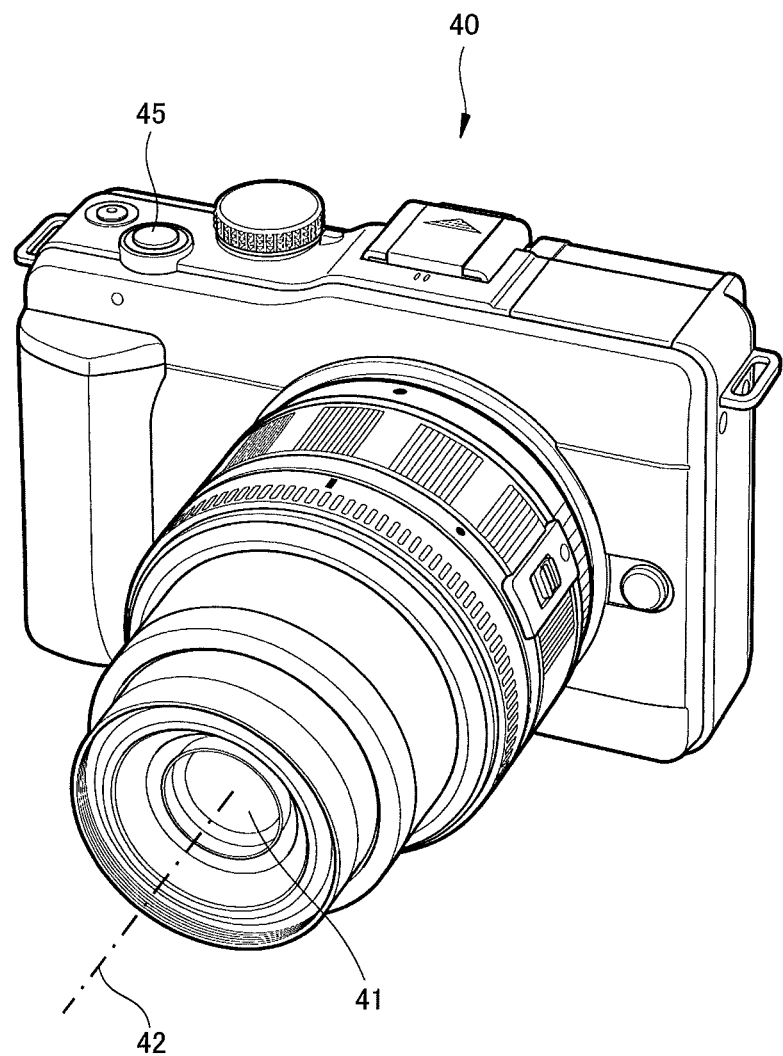
FIG. 23 is a front perspective view of the outside configuration of the inventive digital camera.
Figure 24:
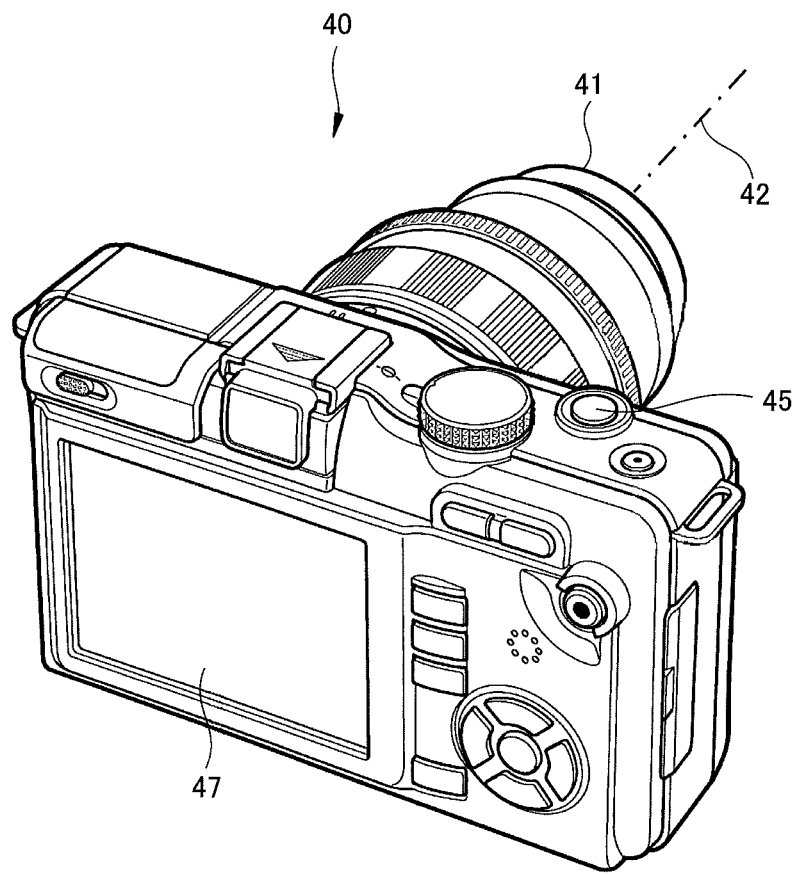
FIG. 24 is a rear perspective view of the outside configuration of the inventive digital camera.

FIGS. 23 and 24 are illustrative in conception of the inventive imaging apparatus in which the zoom lens is built in an image-taking optical system 41. More specifically, FIG. 23 is a front perspective view of the outside configuration of a digital camera 40, and FIG. 24 is a rear view of the same.

In this embodiment, the digital camera 40 includes an image-taking optical system 41 positioned on a taking optical path 42, a shutter button 45, a liquid crystal display monitor 47, and so on. As the shutter button 45 located on the upper portion of the camera 40 is pressed down, it causes images to be taken through the image-taking optical system 41, for instance, the zoom lens of Example 1-1. An object image formed through the image-taking optical system 41 is formed on the imaging device (photoelectric transformation plane) located in the vicinity of the imaging plane. The object image received on the imaging device is displayed as an electronic image on the liquid crystal display monitor 47 located on the back of the camera via a processing means. The taken electronic images may be recorded in a recording means.

Figure 25:
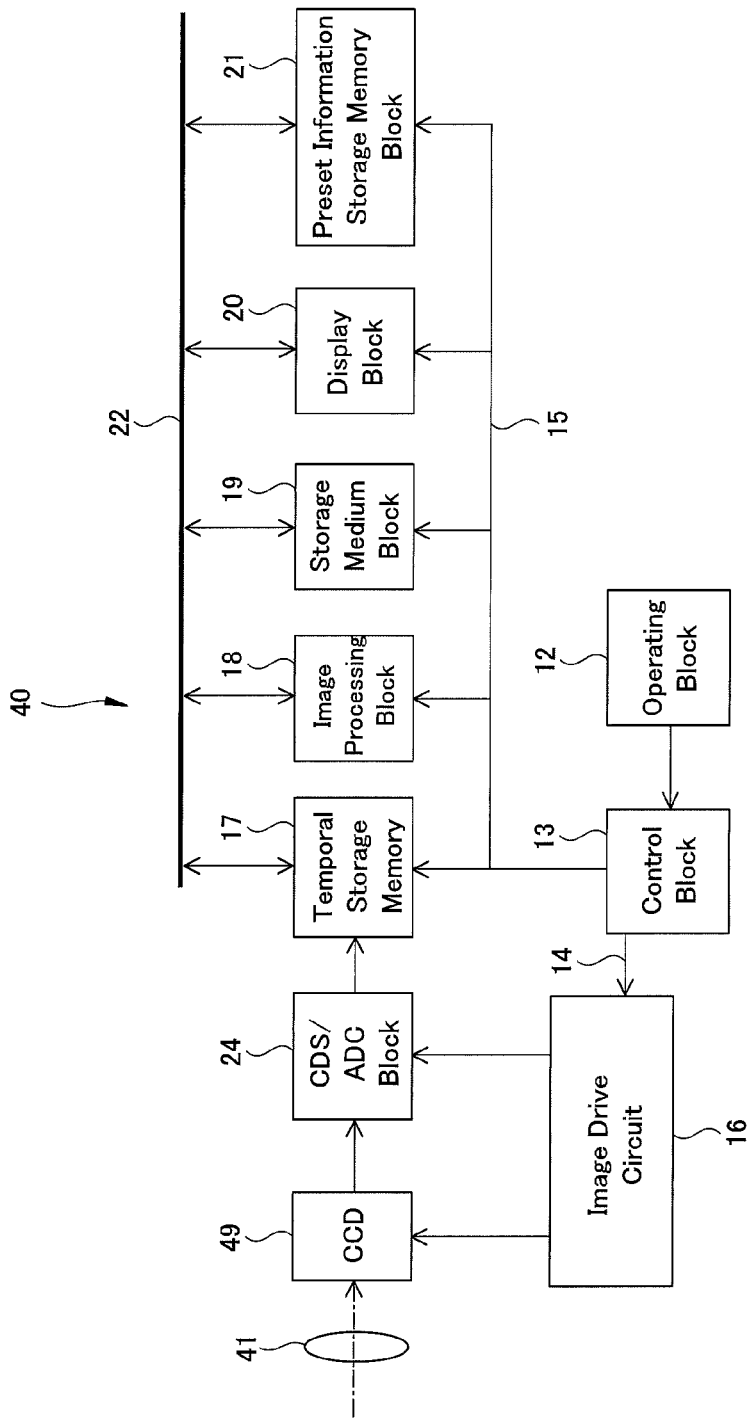
FIG. 25 is a block diagram of the control arrangement for the inventive digital camera.

FIG. 25 is a block diagram for the internal circuitry in the main part of the digital camera 40. In what follows, the aforesaid processing means shown by 51 is made up of, typically, a CDS/ADC block 24, a temporary storage memory 17, and an image processing block 18, and a storage means 52 is made up of, typically, a storage medium block.

As shown in FIG. 25, the digital camera 40 includes an operating block 12, a control block 13 connected to the operating block 12, an imaging drive circuit 16 and a temporal storage memory 17 connected to the control signal output port of the control block 13 via buses 14 and 15, an image processing block 18, a storage medium block 19, a display block 20, and a preset information storage memory block 21.

The temporal storage memory 17, image processing block 18, storage medium block 19, display block 20 and preset storage memory block 21 are designed such that data are mutually entered in or produced out of them via a bus 22, and the imaging drive circuit 16 is connected with the CCD 49 and CDS/ADC block 24.

The operating block 12 is a circuit including various input buttons and switches, through which event information entered (by a camera operator) from outside is notified to the control block. The control block 13 is a central computing unit that is made up of typically a CPU and has a built-in program memory (not shown): it is a circuit that, according to the program loaded in that program memory, receives commands entered by the camera operator via the operating block 12 to have control over the digital camera 40.

The CCD 49 receives an object image formed through the inventive taking optical system 41. More specifically, the CCD 49 is an imaging device that is driven and controlled by the taking drive circuit 16, and converts light quantity per pixel of that object image into electrical signals that are in turn sent out to the CDS/ADC block 24.

The CDS/ADC block 24 is a circuit that amplifies electrical signals entered from CCD 49 and subjects them to analog-to-digital conversion so that image raw data (Bayer data: hereinafter called the RAW data) subjected only to amplification and digital conversion are sent out to the temporal memory 17.

The temporal storage memory 17 is a buffer made up of typically an SDRAM: it is a memory device for temporal storage of the RAW data produced out of the CDS/ADC block 24. The image processing block 18 is a circuit that reads out the RAW data stored in the temporal storage memory 17 or the RAW data stored in the storage medium block 19 thereby electrically implementing various forms of processing based on an image quality parameter instructed by the control block 13.

The storage medium block 19 is a control circuit for a device that detachably receives a card type or stick type recording medium comprising typically a flash memory so that the RAW data transferred from the temporal memory 17 or image data processed at the image processing block 18 are recorded and held in that card type or stick type flash memory.

The display block 20 is a circuit that includes the liquid crystal display monitor 47 and finder image display device 54 to display images, operating menus or the like on them. The preset information storage memory block 21 includes a ROM sub-block having various image quality parameters previously loaded in it, and a RAM sub-block for storing an image quality parameter selected from among image quality parameters read out of that ROM sub-block by entering operation of the operating block 12. The preset information storage memory block 21 is a circuit for controlling inputs to or outputs out of those memories.

The thus assembled digital camera 40, because the inventive zoom lens is used as the image-taking optical system 41, may be used as a small-format imaging apparatus suitable well fit for the taking of moving images.

While various embodiments of the invention have been explained, it is to be understood that the present invention is never limited to them, and embodiments comprising combinations of the essential requirements and limitations are embraced in the category of the invention too.

The invention claimed is:

1. A zoom lens, which comprises, in order from an object side thereof:
   a first lens group of negative refracting power,
   a second lens group of positive refracting power,
   a third lens group of negative refracting power, and
   a fourth lens group of positive refracting power,
   wherein:
   upon zooming from a wide-angle end to a telephoto end of the zoom lens,
   a separation between the respective lens groups changes,
   upon focusing from a focusing-on-infinity state to a close-range focusing state, the third lens group moves in an optical axis direction, and
   the following conditions (1) and (2) are satisfied at the wide-angle end:

$$|(100*(y1'-y1)/y1)|/\Delta s < 1.2 \qquad (1)$$

$$|(100*(y0.7'-y0.7)/y0.7)|/\Delta s < 1.2 \qquad (2)$$

where y1 is a maximum image height on an imaging plane,
   y0.7 is seven-tenth of the maximum image height,
   y1' is a ray height at a position where, when there is a defocus quantity of $\Delta s$ from time of focusing on infinity as the fourth lens group is moved to an object at infinity, a chief ray having the same angle of view as an image-taking angle of view reaching the image height y1 upon focusing on infinity intersects the imaging plane,
   y0.7' is a ray height at a position where, when there is a defocus quantity of $\Delta s$ from time of focusing on infinity as the fourth lens group is moved to an object at infinity, a chief ray having the same angle of view as an image-taking angle of view reaching the image height y0.7 upon focusing on infinity intersects the imaging plane, and
   $\Delta s$ is 8*the maximum image height y1/1000, provided that y1, y0.7, y1', y0.7' and $\Delta s$ are all given in mm.

2. The zoom lens according to claim 1, wherein:
   a total number of lens groups in the zoom lens is 4.

3. The zoom lens according to claim 1, wherein:
   the third lens group wobbles in the optical axis direction prior to focusing.

4. The zoom lens according to claim 1, which satisfies the following Conditions (1-1)' and (2-1)':

$$|(100*(y1'-y1)/y1)|/\Delta s < 0.7 \qquad (1-1)'$$

$$|(100*(y0.7'-y0.7)/y0.7)|/\Delta s < 0.7 \qquad (2-1)'.$$

5. The zoom lens according to claim 1, wherein:
   upon zooming, the first lens group remains fixed in position.

6. The zoom lens according to claim 1, wherein:
   the third lens group consists of two lenses at most, with one of the two lenses being a negative lens.

7. The zoom lens according to claim 6, wherein:
   the third lens group consists of a negative lens.

8. The zoom lens according to claim 6, wherein:
   the third lens group consists of:
   a positive lens, and
   a negative lens.

9. The zoom lens according to claim 8, wherein:
   the positive lens and the negative lens are cemented together.

10. The zoom lens according to claim 1, which satisfies the following Condition (14):

$$0.8 < fbw/fw < 1.8 \qquad (14)$$

where fbw is a distance, as calculated on an air basis, from an image-side surface of a lens on the most image side of the zoom lens to an imaging plane upon focusing on infinity at the wide-angle end, and
    fw is a focal length of the whole zoom lens system upon focusing on infinity at the wide-angle end.

11. The zoom lens according to claim 1, which satisfies the following Conditions (5)', (6)', (7)' and (8)':

$$-2.5 < f1/fw < -0.5 \qquad (5)'$$

$$0.5 < f2/fw < 2.5 \qquad (6)'$$

$$-5.0 < f3/fw < -1.0 \qquad (7)'$$

$$2.0 < f4/fw < 10.0 \qquad (8)'$$

where fw is a focal length of the whole zoom lens system upon focusing on infinity at the wide-angle end,
    f1 is a focal length of the first lens group,
    f2 is a focal length of the second lens group,
    f3 is a focal length of the third lens group, and
    f4 is a focal length of the fourth lens group.

12. The zoom lens according to claim 1, wherein:
the second lens group comprises a plurality of lenses, and there is an aperture stop located on an object side with respect to a position where an air separation between lenses in the second lens group becomes the widest.

13. The zoom lens according to claim 12, wherein:
upon zooming, the aperture stop moves in unison with the second lens group.

14. The zoom lens according to claim 12, which satisfies the following Condition (15):

$$0.08 < d2m/dG2 < 0.5 \quad (15)$$

where d2m is a maximum value of an air separation distance between lenses in the second lens group, and
dG2 is an axial thickness of the second lens group from an object-side refracting surface to an image-side refracting surface.

15. The zoom lens according to claim 1, which satisfies the following Condition (11):

$$8.0 < y1 < 25.0 \quad (11)$$

where y1 is a maximum image height at the imaging plane throughout the zoom lens system.

16. The zoom lens according to claim 1, wherein:
upon zooming, the fourth lens group remains fixed in position.

17. The zoom lens according to claim 16, wherein:
upon focusing from a focusing-on-infinity state to a close-range focusing state, the third lens group moves to the image side, and
upon zooming from the wide-angle end to the telephoto end, the second lens group, and the third lens group moves to the object side.

18. The zoom lens according to claim 1, which satisfies the following Conditions (12)' and (13)':

$$2.5 < ft/fw < 7.0 \quad (12)'$$

$$35° < \omega w < 50° \quad (13)'$$

where fw is a focal length of the whole zoom lens system upon focusing on infinity at the wide-angle end,
ft is a focal length of the whole zoom lens system upon focusing on infinity at the telephoto end, and
ωw is a maximum half angle of view of the whole zoom lens system upon focusing on infinity at the wide-angle end.

19. An imaging apparatus, comprising:
a zoom lens as recited in claim 1, and
an imaging device.

* * * * *